US011983798B2

(12) United States Patent
Tan et al.

(10) Patent No.: US 11,983,798 B2
(45) Date of Patent: May 14, 2024

(54) AI-BASED REGION-OF-INTEREST MASKS FOR IMPROVED DATA RECONSTRUCTION

(71) Applicant: GE Precision Healthcare LLC, Milwaukee, WI (US)

(72) Inventors: Tao Tan, Nuenen (NL); Buer Qi, Beijing (CN); Dejun Wang, Beijing (IN); Gopal B. Avinash, Concord, CA (US); Gireesha Chinthamani Rao, Pewaukee, WI (US); German Guillermo Vera Gonzalez, Menomonee Falls, WI (US); Lehel Ferenczi, Dunakeszi (HU)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 368 days.

(21) Appl. No.: 17/392,431

(22) Filed: Aug. 3, 2021

(65) Prior Publication Data
US 2023/0041575 A1    Feb. 9, 2023

(51) Int. Cl.
*G06T 11/00* (2006.01)
*G06N 20/00* (2019.01)

(52) U.S. Cl.
CPC ............ *G06T 11/005* (2013.01); *G06N 20/00* (2019.01); *G06T 11/006* (2013.01); *G06T 2210/41* (2013.01); *G06T 2211/40* (2013.01)

(58) Field of Classification Search
CPC . G06T 11/005; G06T 11/006; G06T 2210/41; G06T 2211/40; G06N 20/00; G06N 3/048; G06N 7/01; G06N 20/10
See application file for complete search history.

(56) References Cited

U.S. PATENT DOCUMENTS

| | | | | |
|---|---|---|---|---|
| 2009/0010540 A1* | 1/2009 | Mullick | | G06T 7/38 382/170 |
| 2014/0314294 A1* | 10/2014 | Shinagawa | | G06T 7/143 382/131 |
| 2014/0321710 A1* | 10/2014 | Robert | | A61B 34/20 382/103 |

(Continued)

OTHER PUBLICATIONS

Shimadzu | https://www.shimadzu.com.cn/medical/news/20200917.html, webpage, last accessed Jun. 12, 2021.

(Continued)

*Primary Examiner* — Van D Huynh
(74) *Attorney, Agent, or Firm* — Amin, Turocy & Watson, LLP

(57) ABSTRACT

Systems/techniques that facilitate AI-based region-of-interest masks for improved data reconstructions are provided. In various embodiments, a system can access a set of two-dimensional medical scan projections. In various aspects, the system can generate a set of two-dimensional region-of-interest masks respectively corresponding to the set of two-dimensional medical scan projections. In various instances, the system can generate a region-of-interest visualization based on the set of two-dimensional region-of-interest masks and the set of two-dimensional medical scan projections. In various cases, the system can generate the set of two-dimensional region-of-interest masks by executing a machine learning segmentation model on the set of two-dimensional medical scan projections.

20 Claims, 25 Drawing Sheets

(56) References Cited

U.S. PATENT DOCUMENTS

| | | | | |
|---|---|---|---|---|
| 2016/0048984 A1* | 2/2016 | Frigo | .................... | G06T 11/008 382/131 |
| 2019/0216409 A1* | 7/2019 | Zhou | .................... | G06T 7/11 |
| 2021/0397966 A1* | 12/2021 | Sun | .................... | G06T 7/10 |
| 2022/0284584 A1* | 9/2022 | Lee | .................... | G06V 10/82 |
| 2022/0392616 A1* | 12/2022 | Ghose | .................... | G06T 7/11 |

OTHER PUBLICATIONS

Zhou, Q. et al | "Multimodal" Imaging Performance and Clinical Application of Coronavirus Disease 2019 (COVID-19). Research Square, Dec. 22, 2020, 8 pages.

Van Schie, G. et al | Mass detection in reconstructed digital breast tomosynthesis volumes with a computer-aided detection system trained on 2D mammograms. Med Phys. Apr. 2013;40(4):041902. doi: 10.1118/1.4791643. PMID: 23556896, 11 pages.

Calvo, Im. et al. | Digital Tomosynthesis and COVID-19: An improvement in the assessment of pulmonary opacities. DOI: 10.1016/j.arbr.2020.06.005, Oct. 20, 2020, 7 pages.

Calvo, I. et al | Digital Tomosynthesis and COVID-19: An improvement in the assessment of pulmonary opacities (Tomografía Digital y COVID-19: un avance en la valoración de opacidades pulmonares). Arch Bronconeumol. 2020;56:761-763, 3 pages.

Bertolaccini, L. et al. | Digital tomosynthesis in lung cancer: state of the artAnn Transl Med. Jun. 2015; 3(10): 139, doi: 10.3978/j.issn.2305-5839.2015.06.03, 4 pages.

Chauvie, S. et al. | Artificial intelligence and radiomics enhance the positive predictive value of digital chest tomosynthesis for lung cancer detection within SOS clinical trial. Eur Radiol 30, 4134-4140 (2020). https://doi.org/10.1007/s00330-020-06783-z, 7 pages.

Miroshnychenko, S. et al. | Using tomosynthesis for detection of pneumonia caused by COVID-19. 10.13140/RG.2.2.23921.43363, Apr. 6, 2020, 4 pages.

\* cited by examiner

AI-BASED REGION-OF-INTEREST MASKS FOR IMPROVED DATA RECONSTRUCTION

TECHNICAL FIELD

The subject disclosure relates generally to data reconstruction, and more specifically to AI-based region-of-interest masks for improved data reconstruction.

BACKGROUND

To capture a medical image of an anatomical structure of a patient, a set of raw two-dimensional projections of the anatomical structure are recorded by medical scanning equipment, and a three-dimensional medical image of the anatomical structure is reconstructed from the set of raw two-dimensional projections. Accordingly, slices of the reconstructed three-dimensional image can be analyzed by artificial intelligence techniques for purposes of diagnosis and/or prognosis. However, applying artificial intelligence techniques to such reconstructed slices can be suboptimal.

Accordingly, systems and/or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate AI-based region-of-interest masks for improved data reconstruction are described.

According to one or more embodiments, a system is provided. The system can comprise a computer-readable memory that can store computer-executable components. The system can further comprise a processor that can be operably coupled to the computer-readable memory and that can execute the computer-executable components stored in the computer-readable memory. In various embodiments, the computer-executable components can comprise a projection component. In various aspects, the projection component can access a set of two-dimensional medical scan projections. In various instances, the computer-executable components can further comprise a mask component. In various cases, the mask component can generate a set of two-dimensional region-of-interest masks respectively corresponding to the set of two-dimensional medical scan projections. In various aspects, the computer-executable components can further comprise a reconstruction component. In various instances, the reconstruction component can generate a region-of-interest visualization based on the set of two-dimensional region-of-interest masks and the set of two-dimensional medical scan projections. In various cases, the mask component can generate the set of two-dimensional medical scan projections by executing a machine learning segmentation model on the set of two-dimensional medical scan projections.

According to one or more embodiments, the above-described system can be implemented as a computer-implemented method and/or a computer program product.

DETAILED DESCRIPTION

Figure 1:
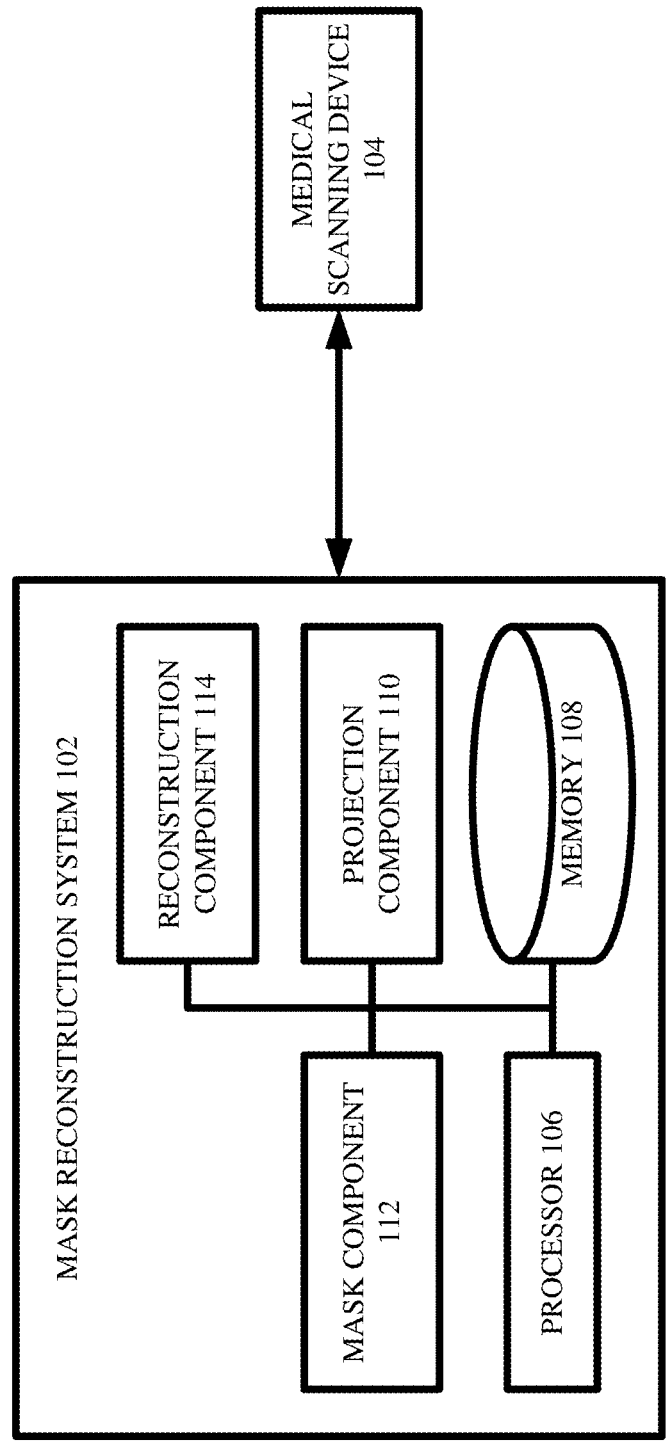
FIG. 1 illustrates a block diagram of an example, non-limiting system that facilitates AI-based region-of-interest masks for improved data reconstruction in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

To capture a medical image (e.g., X-ray scanned image, computed tomography (CT) scanned image, positron emission tomography (PET) scanned image, magnetic resonance imaging (MRI) scanned image) of an anatomical structure of a patient, a set of raw two-dimensional projections of the anatomical structure can be recorded by medical scanning equipment, and a three-dimensional medical image of the anatomical structure can be reconstructed from the set of raw two-dimensional projections. More specifically, medical scanning equipment (e.g., an X-ray scanner, a CT scanner, a PET scanner, an MRI scanner) can include a light-emitting device that sweeps through a plurality of locations in a focal plane/surface and that emits, at each of the plurality of locations, a particular wavelength of electromagnetic radiation through the anatomical structure of the patient and onto an optical detector. Thus, for each given location in the focal plane/surface, the optical detector can record at least one raw two-dimensional projection that is formed by the electromagnetic radiation that is emitted from that given location and that is recorded by the optical detector after having passed through the anatomical structure. Once the light-emitting device has completed one or more sweeps across the focal plane/surface, the result can be the set of raw two-dimensional projections that collectively depict the anatomical structure from various angles and/or perspectives. Accordingly, any suitable reconstruction techniques (e.g., analytical image reconstruction, iterative image reconstruction) can be applied to the set of raw two-dimensional projections, thereby yielding the reconstructed three-dimensional medical image of the anatomical structure.

Once the reconstructed three-dimensional medical image is obtained, slices of the reconstructed three-dimensional medical image can be analyzed by artificial intelligence techniques for purposes of diagnosis and/or prognosis. That is, one or more two-dimensional slices of the reconstructed three-dimensional medical image can be fed as input into a machine learning model, where the machine learning model is configured to identify as output one or more regions-of-interest (e.g., such as pathology manifestations and/or disease regions) that are depicted in the one or more two-dimensional slices.

As recognized by the inventors of various embodiments described herein, applying artificial intelligence techniques to such reconstructed slices can be suboptimal. Indeed, in today's clinical practice, most machine learning models that are configured to generate diagnoses/prognoses and/or to otherwise identify regions-of-interest are trained on images that are significantly different from reconstructed slices, which means that such machine learning models can be prone to false positives and/or false negatives when executed on such reconstructed slices. Moreover, as recognized by the inventors of various embodiments described herein, when a machine learning model generates a false positive/negative based on a reconstructed slice, such false positive/negative can significantly mislead attending medical professionals. In other words, when existing techniques are implemented, there is no way to suppress and/or otherwise dilute the influence of a false positive/negative output that is generated based on a reconstructed slice. Furthermore, image reconstruction can sometimes result in the formation of computer-generated artefacts in the reconstructed slices, and such artefacts can negatively affect the performance efficacy of machine learning models. That is, the reconstructed slices can sometimes not accurately depict the geometric relationships between anatomical structures that are desired to be captured, and such inaccurate geometric relationships can cause a machine learning model to exhibit deteriorated accuracy.

Accordingly, systems and/or techniques that can address one or more of these technical problems can be desirable.

Various embodiments of the subject innovation can address one or more of these technical problems. One or more embodiments described herein include systems, computer-implemented methods, apparatus, and/or computer program products that can facilitate AI-based region-of-interest masks for improved data reconstruction. As mentioned above, existing techniques involve recording a set of raw two-dimensional projections, reconstructing a three-dimensional medical image from the set of raw two-dimensional projections, and subsequently executing a machine learning model on two-dimensional slices of the reconstructed three-dimensional medical image so as to identify regions of interest. As also mentioned above, such existing techniques can be prone to inaccurate results due to artefacts and/or weak geometric relationships exhibited by the two-dimensional slices of the reconstructed three-dimensional medical image. Moreover, false positives/negatives outputted on the basis of the two-dimensional slices of the reconstructed three-dimensional medical image can have an unsuppressed and/or undiluted detrimental influence on a final diagnosis/prognosis of an attending medical professional.

The inventors of various embodiments described herein recognized that such technical problems can be ameliorated by executing machine learning models directly on the raw two-dimensional projections, rather than on the reconstructed slices. Indeed, the raw two-dimensional projections can be much likelier to depict strong geometric relationships between illustrated anatomical structures, as compared to the reconstructed slices. Moreover, since the raw two-dimensional projections are not created via image reconstruction techniques, the raw two-dimensional projections can lack artefacts associated with image reconstruction, unlike the reconstructed slices. Furthermore, by executing artificial intelligence techniques on each of the raw two-dimensional projections, any given false positive/negative output can be diluted and/or suppressed by subsequent image reconstruction as described herein. In contrast, since existing techniques involve applying artificial intelligence techniques after image reconstruction, existing techniques do not involve any subsequent reconstruction that can suppress and/or dilute false positives/negatives. Thus, as described herein, more accurate region-of-interest identification (e.g., more accurate diagnoses/prognoses) can be obtained by first executing artificial intelligence techniques on raw two-dimensional projections and subsequently applying image reconstruction, rather than first applying image reconstruction and subsequently executing artificial intelligence techniques on reconstructed slices.

In various aspects, embodiments of the subject innovation can be considered as a computerized tool that can facilitate AI-based region-of-interest masks for improved data reconstruction. In various instances, the computerized tool described herein can comprise a projection component, a mask component, and/or a reconstruction component.

In various embodiments, the computerized tool can be in electronic communication with a medical scanning device. In various aspects, the medical scanning device can be any suitable equipment that is configured to capture and/or generate medical images. For example, the medical scanning device can be an X-ray scanner, a CT scanner, a PET scanner, and/or an MRI scanner. In any case, the medical scanning device can record and/or capture a set of raw two-dimensional projections of an anatomical structure of a patient. More specifically, in various instances, the medical scanning device can include a light emitter than emits any suitable wavelength of electromagnetic radiation through the anatomical structure and onto an optical detector, with the resultant image recorded by the optical detector being considered as a raw two-dimensional projection of the anatomical structure. In various cases, the medical scanning device can sweep the light emitter across a focal surface, thereby causing the light emitter to sequentially emit electromagnetic radiation from a plurality of different locations on the focal surface. The result of such sweeping can be the set of raw two-dimensional projections, with each of the set of raw two-dimensional projections being an array of pixels that depicts the anatomical structure of the patient from a unique perspective and/or angle.

In various embodiments, the projection component of the computerized tool can electronically receive and/or otherwise electronically access the set of raw two-dimensional projections. In various cases, the projection component can electronically retrieve the set of raw two-dimensional projections from the medical scanning device. That is, the medical scanning device can electronically transmit the set of raw two-dimensional projections to the projection component. In various other cases, the medical scanning device can electronically transmit the set of raw two-dimensional projections to any suitable data structure (e.g., graph data structure, relational data structure, hybrid data structure, whether centralized and/or decentralized), and the projection component can electronically retrieve the set of raw two-dimensional projections from the data structure. In any case, the projection component can access and/or obtain the set of raw two-dimensional projections, such that other components of the computerized tool can electronically interact with and/or otherwise manipulate the set of raw two-dimensional projections.

In various embodiments, the mask component of the computerized tool can electronically generate a set of two-dimensional region-of-interest masks based on the set of raw two-dimensional projections. More specifically, in various aspects, the mask component can electronically maintain and/or otherwise electronically control a machine learning segmentation model. In various instances, the machine learning segmentation model can exhibit any suitable artificial intelligence architecture. For example, in some cases, the machine learning segmentation model can be a neural network having any suitable number of layers, having any suitable numbers of neurons in various layers, having any suitable activation functions in various neurons, and/or having any suitable interneuron connectivity patterns. In various aspects, the machine learning segmentation model can be trained and/or configured to segment raw two-dimensional projections so as to detect regions of interest that are depicted and/or illustrated in the raw two-dimensional projections. In other words, the machine learning segmentation model can be designed to receive as input a given raw two-dimensional projection and to produce as output a given segmentation based on the given raw two-dimensional projection. In various cases, the given segmentation can be a pixel-wise mask that indicates which pixels of the given raw two-dimensional projection make up and/or otherwise belong to a region-of-interest that is depicted and/or illustrated in the given raw two-dimensional projection. If no region-of-interest is depicted/illustrated in the given raw two-dimensional projection, the given segmentation can indicate that no pixels of the given raw two-dimensional projection make up and/or otherwise belong to the region-of-interest. Accordingly, the given segmentation can, in some cases, be referred to as a region-of-interest mask. In various instances, a region-of-interest can be any suitable region, part, and/or portion of and/or otherwise associated with the anatomical structure of the patient. For example, a region-of-interest can be a disease region and/or a pathology region (e.g., a tumor, a nodule, scar tissue, a fracture, an occluded vessel) of the anatomical structure that is depicted/illustrated in a raw two-dimensional projection (e.g., if the anatomical structure is a lung, the region-of-interest can be a COVID-19 symptom and/or a pneumonia symptom that is present within the lung). In any case, the mask component can electronically execute the machine learning segmentation model on each of the set of raw two-dimensional projections, thereby yielding a set of two-dimensional region-of-interest masks that respectively correspond to the set of raw two-dimensional projections (e.g., one respectively corresponding two-dimensional region-of-interest mask for each raw two-dimensional projection).

In various embodiments, the reconstruction component of the computerized tool can electronically generate a three-dimensional region-of-interest visualization based on both the set of two-dimensional region-of-interest masks and the set of raw two-dimensional projections. In various cases, there are at least two alternative fashions in which the reconstruction component can generate the three-dimensional region-of-interest visualization.

In one or more first embodiments, the three-dimensional region-of-interest visualization can be based on superimposition. Specifically, in various aspects, the reconstruction component can electronically apply any suitable image reconstruction techniques (e.g., analytic reconstruction techniques such as filtered backprojection; and/or iterative reconstruction techniques such as algebraic reconstruction, iterative Sparse Asymptotic Minimum Variance, statistical reconstruction, and/or learned reconstruction) to the set of raw two-dimensional projections, thereby yielding a three-dimensional image volume. As mentioned above, each of the set of raw two-dimensional projections can be considered as a pixel array. In contrast, the three-dimensional image volume can be considered as a voxel array. Moreover, as mentioned above, the set of raw two-dimensional projections can collectively depict/illustrate various two-dimensional perspective views of the anatomical structure of the patient. In contrast, the three-dimensional image volume can be considered as a three-dimensional representation of the anatomical structure that is built based on such various two-dimensional perspective views.

In similar fashion, the reconstruction component can electronically apply any suitable image reconstruction techniques to the set of two-dimensional region-of-interest masks, thereby yielding a three-dimensional region-of-interest mask. In various cases, each of the set of two-dimensional region-of-interest masks can be considered as a pixel array. In contrast, the three-dimensional region-of-interest mask can be considered as a voxel array. Furthermore, as mentioned above, the set of two-dimensional region-of-interest masks can collectively indicate which pixels of the set of raw two-dimensional projections make up and/or belong to a region-of-interest (e.g., a disease/pathology region) of the anatomical structure of the patient. In contrast, the three-dimensional region-of-interest mask can be considered as a three-dimensional representation of the region-of-interest that is built based on such pixel-wise indications.

In various aspects, the reconstruction component can overlay and/or superimpose the three-dimensional region-of-interest mask onto the three-dimensional image volume, and the result can be considered as the three-dimensional region-of-interest visualization. More specifically, in various cases, the reconstruction component can break the three-dimensional image volume up into any suitable number of slices, and the reconstruction component can break the three-dimensional region-of-interest mask up into the same number of slices. Thus, in various instances, the reconstruction component can overlay and/or superimpose the slices of the three-dimensional region-of-interest mask onto respectively correspondingly slices of the three-dimensional image volume. In any case, the result of such overlay and/or superimposition can be that the three-dimensional region-of-interest visualization visually depicts and/or shows the anatomical structure of the patient and also visually emphasizes where the region-of-interest is located in the anatomical structure of the patient. Thus, the three-dimensional region-of-interest visualization can be manually viewed and/or otherwise leveraged by a medical professional for purposes of diagnosis/prognosis.

In one or more second embodiments that are alternative to the one or more first embodiments, the three-dimensional region-of-interest visualization can be based on weighted reconstruction. Specifically, in various aspects, the reconstruction component can electronically apply any suitable weighted image reconstruction techniques to both the set of raw two-dimensional projections and the set of two-dimensional region-of-interest masks, thereby yielding an enhanced three-dimensional image volume. In other words, the reconstruction component can enhance and/or weight the pixels of each of the set of raw two-dimensional projections by a respectively corresponding one of the set of two-dimensional region-of-interest masks, thereby yielding a set of enhanced (e.g., not raw) two-dimensional projections, and the reconstruction component can accordingly apply any suitable image reconstruction technique to the set of enhanced two-dimensional projections, with the result being the enhanced three-dimensional image volume. In various aspects, the enhanced three-dimensional image volume can be considered as the three-dimensional region-of-interest visualization. In any case, the result of such weighted reconstruction can be that the three-dimensional region-of-interest visualization visually depicts and/or shows the anatomical structure of the patient and also visually emphasizes where the region-of-interest is located in the anatomical structure of the patient. Thus, the three-dimensional region-of-interest visualization can be manually viewed and/or otherwise leveraged by a medical professional for purposes of diagnosis/prognosis.

In various cases, the three-dimensional region-of-interest visualization can be used and/or leveraged by medical professionals for diagnosis/prognosis, no matter how the three-dimensional region-of-interest visualization is generated. However, those having ordinary skill in the art will appreciate that the three-dimensional region-of-interest visualization produced by the one or more first embodiments is differently structured and/or differently constituted than the three-dimensional region-of-interest visualization produced by the one or more second embodiments. Again, in the one or more first embodiments, the reconstruction component can reconstruct a three-dimensional image volume from the set of raw two-dimensional projections, can reconstruct a three-dimensional region-of-interest mask from the set of two-dimensional region-of-interest masks, and can overlay and/or superimpose slices of the three-dimensional region-of-interest mask onto respective slices of the three-dimensional image volume. The result of such overlay and/or superimposition can be treated as the three-dimensional region-of-interest visualization when the one or more first embodiments are implemented. In contrast, in the one or more second embodiments, the reconstruction component can respectively weight the set of raw two-dimensional projections by the set of two-dimensional region-of-interest masks, and can reconstruct an enhanced three-dimensional image volume from the set of weighted two-dimensional projections. The result of such weighted reconstruction can be treated as the three-dimensional region-of-interest visualization when the one or more second embodiments are implemented. In either case, the three-dimensional region-of-interest mask can visually depict the anatomical structure of the patient and can visually emphasize/highlight the region-of-interest of the anatomical structure. In the one or more first embodiments, such visual emphasis is achieved via superimposition. In the one or more second embodiments, such visual emphasis is instead achieved via weighted reconstruction. In any case, the computerized tool described herein can generate the three-dimensional region-of-interest visualization, which can be used by medical professionals for purposes of diagnosis/prognosis.

Note that, in any case, the set of two-dimensional region-of-interest masks can be created before application of image reconstruction. Accordingly, subsequent image reconstruction that is applied to the set of two-dimensional region-of-interest masks (e.g., either in the one or more first embodiments or in the one or more second embodiments) to create the three-dimensional region-of-interest visualization can combine and/or aggregate the set of two-dimensional region-of-interest masks together. In various cases, such combination and/or aggregation can suppress and/or otherwise dilute the influence of one or a few false positive/negative masks in the set of two-dimensional region-of-interest masks. In other words, if the set of two-dimensional region-of-interest masks contain a small number (e.g., lesser than any suitable threshold) of inaccurate results, combination and/or aggregation of the set of two-dimensional region-of-interest masks by subsequent image reconstruction can be considered as having an averaging effect that minimizes the importance and/or noticeability of the small number of inaccurate results. Accordingly, such inaccurate results can be absent from and/or not highly noticeable in the three-dimensional region-of-interest visualization.

In various aspects, it can sometimes be the case that the computerized tool is not in electronic communication with the medical scanning device and thus lacks electronic access to the set of raw two-dimensional projections. Instead, it can be the case that the computerized tool has electronic access to a pre-existing three-dimensional image volume that depicts and/or illustrates a three-dimensional representation of the anatomical structure of the patient. In such cases, the projection component can electronically receive, retrieve, and/or otherwise access the pre-existing three-dimensional image volume. In various instances, the projection component can electronically generate the set of raw two-dimensional projections by applying any suitable projection techniques to the pre-existing three-dimensional image volume. As those having ordinary skill in the art will appreciate, projection techniques can, in various instances, be considered as the mathematical inverse of reconstruction techniques. That is, reconstruction techniques can create voxels from pixels, whereas projection techniques can create pixels from voxels. Thus, if the projection component has access to the pre-existing three-dimensional image volume, the projection component can decompose the pre-existing three-dimensional image volume into the set of raw two-dimensional projections. Accordingly, as described above, the mask component can generate the set of two-dimensional region-of-interest masks based on the set of raw two-dimensional projections, and the reconstruction component can generate the three-dimensional region-of-interest visualization based on both the set of two-dimensional region-of-interest masks and the set of raw two-dimensional projections. Note that, if the one or more first embodiments are implemented when the pre-existing three-dimensional image volume is available, then the reconstruction component can refrain from applying reconstruction techniques to the set of raw two-dimensional projections to generate a three-dimensional image volume and can instead just utilize the pre-existing three-dimensional image volume.

In various instances, it can be the case that the computerized tool does not maintain and/or control the machine learning segmentation model. Instead, it can be the case that the computerized tool has access to a pre-existing three-dimensional region-of-interest mask. For instance, it can be the case that some other entity had applied artificial intelligence techniques to the pre-existing three-dimensional image volume, thereby yielding the pre-existing three-dimensional region-of-interest mask. In such cases, the mask component can electronically generate the set of two-dimensional region-of-interest masks by applying any suitable projection techniques to the pre-existing three-dimensional region-of-interest mask. Again, projection techniques can be considered as creating pixels from voxels. So, if the mask component has access to the pre-existing three-dimensional region-of-interest mask, the mask component can decompose the pre-existing three-dimensional region-of-interest mask into the set of two-dimensional region-of-interest masks. Accordingly, as described above, the reconstruction component can generate the three-dimensional region-of-interest visualization based on both the set of two-dimensional region-of-interest masks and the set of raw two-dimensional projections. Note that, if the one or more first embodiments are implemented when the pre-existing three-dimensional region-of-interest mask is available, then the reconstruction component can refrain from applying reconstruction techniques to the set of two-dimensional region-of-interest masks to generate a three-dimensional region-of-interest mask and can instead just utilize the pre-existing three-dimensional region-of-interest mask.

In various aspects, the computerized tool described herein can electronically obtain a set of raw two-dimensional projections, can electronically generate a set of two-dimensional region-of-interest masks based on the set of raw two-dimensional projections, and can electronically generate a three-dimensional region-of-interest visualization (e.g., via superimposition and/or weighted reconstruction) based on both the set of two-dimensional region-of-interest masks and the set of raw two-dimensional projections. As mentioned above, existing techniques first apply image reconstruction to raw projections and then apply artificial intelligence techniques to reconstructed slices. As explained herein, such existing techniques suffer from various problems. Specifically, artefacts formed during reconstruction can negatively affect subsequent region-of-interest detection by artificial intelligence techniques, and false positive/negative results of such artificial intelligence algorithms are not suppressed/diluted by subsequent image reconstruction. In contrast, the computerized tool described herein can first apply artificial intelligence techniques to raw projections, thereby yielding two-dimensional region-of-interest masks, and the computerized tool can then apply image reconstruction to both the raw projections and the two-dimensional region-of-interest masks. By applying reconstruction after the artificial intelligence techniques, the computerized tool can avoid executing the artificial intelligence techniques on reconstruction-based artefacts and can suppress and/or dilute false positives/negatives generated by the artificial intelligence techniques.

Various embodiments of the subject innovation can be employed to use hardware and/or software to solve problems that are highly technical in nature (e.g., to facilitate AI-based region-of-interest masks for improved data reconstruction), that are not abstract and that cannot be performed as a set of mental acts by a human. Further, some of the processes performed can be performed by a specialized computer (e.g., machine learning segmentation model, medical scanning device) for carrying out defined tasks related to AI-based region-of-interest masks for improved data reconstruction. For example, such defined tasks can include: accessing, by a device operatively coupled to a processor, a set of two-dimensional medical scan projections; generating, by the device, a set of two-dimensional region-of-interest masks respectively corresponding to the set of two-dimensional medical scan projections; and generating, by the device, a region-of-interest visualization based on the set of two-dimensional region-of-interest masks and the set of two-dimensional medical scan projections. In various cases, the generating the set of two-dimensional region-of-interest masks can include executing, by the device, a machine learning segmentation model on the set of two-dimensional medical scan projections.

Such defined tasks are not performed manually by humans. Indeed, neither the human mind nor a human with pen and paper can electronically receive a set of raw two-dimensional projections, electronically generate a set of two-dimensional region-of-interest masks by executing a machine learning segmentation model on each of the set of raw two-dimensional projections, and electronically generate a three-dimensional region-of-interest visualization by applying image reconstruction to both the set of two-dimensional region-of-interest masks and the set of raw two-dimensional projections. Instead, various embodiments of the subject innovation are inherently and inextricably tied to computer technology and cannot be implemented outside of a computing environment (e.g., embodiments of the subject innovation constitute a computerized tool that implement AI-based region-of-interest masks for improved data reconstruction; such a computerized tool cannot be practicably implemented in any sensible way without computers).

Moreover, various embodiments of the subject innovation can integrate into a practical application various teachings described herein relating to the field of data reconstruction. As explained above, existing techniques first apply data reconstruction to raw projections and subsequently execute artificial intelligence techniques on reconstructed slices. Such existing techniques suffer from various problems. Specifically, image reconstruction can sometimes cause the formation of artefacts. Thus, application of artificial intelligence techniques after image reconstruction can cause the results of such artificial intelligence techniques to be detrimentally affected by such artefacts. Additionally, by applying artificial intelligence techniques after image reconstruction, there is no way by which to suppress and/or dilute the influence of false positives/negatives generated from such artificial intelligence techniques. In various aspects, the computerized tool described herein can address these technical problems. In various cases, the computerized tool can first apply artificial intelligence techniques to raw projections, thereby yielding two-dimensional segmentation masks, and can subsequently apply image reconstruction to both the raw projections and the two-dimensional segmentation masks. Since the computerized tool can apply artificial intelligence techniques prior to image reconstruction, artefacts caused by image reconstruction can be not received as input by the artificial intelligence techniques, meaning that such artefacts can refrain from detrimentally affecting the results generated by the artificial intelligence techniques. Furthermore, since the computerized tool can apply image reconstruction after the artificial intelligence techniques, false positives/negatives outputted by the artificial intelligence techniques can be suppressed and/or diluted via aggregation during image reconstruction. Accordingly, the computerized tool described herein can be considered as a concrete and tangible technical improvement in the field of data reconstruction, and thus clearly constitutes a useful and practical application of computers.

Furthermore, various embodiments of the subject innovation can control real-world tangible devices based on the disclosed teachings. For example, various embodiments of the subject innovation can electronically execute a real-world machine learning segmentation model on real-world medical projections (e.g., X-ray projections, CT-projections, PET projections, MRI projections), so as to generate improved real-world medical visualizations that can be used by real-world medical clinicians for diagnosis/prognosis.

It should be appreciated that the herein figures and description provide non-limiting examples of the subject innovation and are not necessarily drawn to scale.

FIG. 1 illustrates a block diagram of an example, non-limiting system 100 that can facilitate AI-based region-of-interest masks for improved data reconstruction in accordance with one or more embodiments described herein. As shown, a mask reconstruction system 102 can be electronically integrated, via any suitable wired and/or wireless electronic connection, with a medical scanning device 104.

In various aspects, the medical scanning device 104 can be any suitable type of medical imaging equipment. For example, the medical scanning device 104 can be an X-ray scanner. As another example, the medical scanning device 104 can be a CT scanner. As still another example, the medical scanning device 104 can be a PET scanner. As yet another example, the medical scanning device 104 can be an MRI scanner. In various instances, the medical scanning device 104 can electronically generate, record, and/or otherwise capture a set of 2D (e.g., two-dimensional) medical scan projections that depict and/or otherwise illustrate any suitable anatomical structure (e.g., head, brain, lung, chest, blood vessel, and/or any other suitable body part and/or organ) of a patient (e.g., human and/or otherwise). In various cases, each projection in the set of 2D medical scan projections can be a two-dimensional pixel array that depicts and/or illustrates the anatomical structure (and/or a portion thereof) from a respectively corresponding perspective, angle, and/or view.

In various cases, it can be desired to generate a 3D (e.g., three-dimensional) medical visualization based on the set of 2D medical scan projections. As explained herein, the mask reconstruction system 102 can facilitate such functionality.

In various embodiments, the mask reconstruction system 102 can comprise a processor 106 (e.g., computer processing unit, microprocessor) and a computer-readable memory 108 that is operably and/or operatively and/or communicatively connected/coupled to the processor 106. The computer-readable memory 108 can store computer-executable instructions which, upon execution by the processor 106, can cause the processor 106 and/or other components of the mask reconstruction system 102 (e.g., projection component 110, mask component 112, reconstruction component 114) to perform one or more acts. In various embodiments, the computer-readable memory 108 can store computer-executable components (e.g., projection component 110, mask component 112, reconstruction component 114), and the processor 106 can execute the computer-executable components.

In various embodiments, the mask reconstruction system 102 can comprise a projection component 110. In various aspects, the projection component 110 can electronically receive and/or otherwise electronically access the set of 2D medical scan projections. In various instances, the projection component 110 can electronically retrieve the set of 2D medical scan projections from the medical scanning device 104. In various other instances, the projection component 110 can electronically retrieve the set of 2D medical scan projections from any other suitable computing device and/or data structure that is electronically accessible to the projection component 110, whether remote from and/or local to the projection component 110. In any case, the projection component 110 can electronically obtain and/or access the set of 2D medical scan projections, such that other components of the mask reconstruction system 102 can read, manipulate, and/or otherwise electronically interact with the set of 2D medical scan projections.

In various embodiments, the mask reconstruction system 102 can comprise a mask component 112. In various aspects, the mask component 112 can electronically generate a set of 2D region-of-interest masks based on the set of 2D medical scan projections. More specifically, in various instances, the mask component 112 can electronically store, maintain, and/or otherwise control a machine learning segmentation model. In various cases, the machine learning segmentation model can be configured to receive as input a 2D medical scan projection and to produce as output a segmentation corresponding to the inputted 2D medical scan projection. In various aspects, the outputted segmentation can be a pixel-wise mask that indicates which, if any, pixels of the inputted 2D medical scan projection make up and/or belong to one or more regions-of-interest that are associated with the anatomical structure. For example, a region-of-interest can be a diseased and/or damaged portion of the anatomical structure. In some cases, the outputted segmentation can be a hard pixel-wise mask, which definitely assigns each pixel of the inputted 2D medical scan projection to a region-of-interest class or to a background class. In other cases, the outputted segmentation can be a soft pixel-wise mask, which assigns to each pixel of the inputted 2D medical scan projection a probability of belonging to a region-of-interest class. In any case, the mask component 112 can electronically execute the machine learning segmentation model on each of the set of 2D medical scan projections, thereby yielding a set of 2D region-of-interest masks that respectively correspond to the set of 2D medical scan projections.

In various embodiments, the mask reconstruction system 102 can comprise a reconstruction component 114. In various aspects, the reconstruction component 114 can electronically generate a 3D region-of-interest visualization based on both the set of 2D region-of-interest masks and the set of 2D medical scan projections. In various instances, there are at least two alternative ways in which the reconstruction component 114 can accomplish this functionality.

In one or more first embodiments, the reconstruction component 114 can generate the 3D region-of-interest visualization via superimposition. More specifically, in various aspects, the reconstruction component 114 can apply an image reconstruction technique to the set of 2D medical scan projections, where the image reconstruction technique can be configured to generate voxel-level information from pixel-level of information. Thus, the result of applying the image reconstruction technique to the set of 2D medical scan projections can be a 3D medical scan volume. In various aspects, the reconstruction component 114 can apply the image reconstruction technique to the set of 2D region-of-interest masks generated by the mask component. Thus, the result of applying the image reconstruction technique to the set of 2D region-of-interest masks can be a 3D region-of-interest mask. In various instances, once the 3D medical scan volume and the 3D region-of-interest mask are created, the reconstruction component 114 can overlay and/or superimpose the 3D region-of-interest mask onto the 3D medical scan volume. Accordingly, when a slice of the 3D medical scan volume is rendered and/or displayed, a respectively corresponding slice of the 3D region-of-interest mask can be simultaneously rendered and/or displayed over the slice of the 3D medical scan volume. This can create a visual effect such that the anatomical structure of the patient is depicted by the rendered/displayed slice of the 3D medical scan volume, and such that the region-of-interest associated with the anatomical structure is visually emphasized/highlighted by the respectively corresponding slice of the 3D region-of-interest mask. In various cases, the result obtained through such overlay and/or superimposition can be considered and/or treated as the 3D region-of-interest visualization.

In one or more second embodiments, the reconstruction component 114 can generate the 3D region-of-interest visualization via weighted reconstruction. More specifically, in various aspects, the reconstruction component 114 can apply a weighted image reconstruction technique to both the set of 2D medical scan projections and the set of 2D region-of-interest masks. In other words, the reconstruction component 114 can weight the pixels of each 2D medical scan projection according to a respectively corresponding 2D region-of-interest mask (e.g., such that pixels of the 2D medical scan projection which belong to and/or have a high (above any suitable threshold) probability of belonging to the region-of-interest are increased in value), thereby yielding a set of 2D enhanced medical scan projections. Accordingly, the reconstruction component 114 can apply image reconstruction to the set of 2D enhanced medical scan projections, thereby yielding a 3D enhanced medical scan projection. In various cases, when a slice of the 3D enhanced medical scan projection is rendered and/or displayed, a visual effect can be achieved, such that the rendered/displayed slice depicts and/or illustrates the anatomical structure of the patient, and such that the region-of-interest associated with the anatomical structure is visually emphasized/highlighted by the rendered/displayed slice of the 3D enhanced medical scan volume. In various cases, the result obtained through such weighted reconstruction can be considered and/or treated as the 3D region-of-interest visualization.

Figure 2:
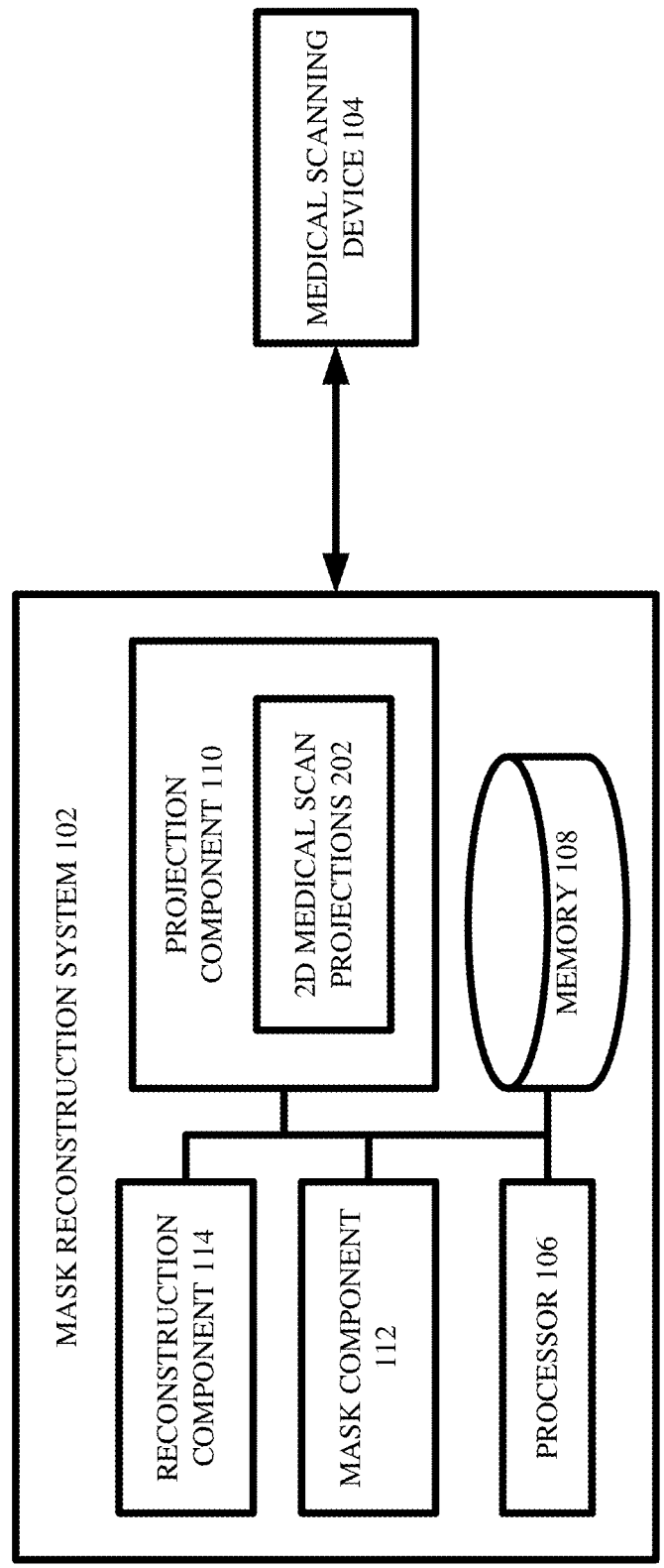
FIG. 2 illustrates a block diagram of an example, non-limiting system including a set of 2D medical scan projections that facilitates AI-based region-of-interest masks for improved data reconstruction in accordance with one or more embodiments described herein.

FIG. 2 illustrates a block diagram of an example, non-limiting system 200 including a set of 2D medical scan projections that can facilitate AI-based region-of-interest masks for improved data reconstruction in accordance with one or more embodiments described herein. As shown, the system 200 can, in some cases, comprise the same components as the system 100, and can further comprise a set of 2D medical scan projections 202.

In various embodiments, the medical scanning device 104 can electronically capture, record, and/or otherwise generate the set of 2D medical scan projections 202 by scanning an anatomical structure of a patient, and the projection component 110 can electronically receive, retrieve, and/or access the set of 2D medical scan projections 202. In various aspects, the set of 2D medical scan projections 202 can comprise any suitable number of projections, with each projection being a two-dimensional pixel array of any suitable dimensionality (e.g., any suitable number of pixels extending in a length-direction, and/or any suitable number of pixels extending in a width-direction) that depicts and/or illustrates a respectively corresponding view of the anatomical structure of the patient. That is, different projections in the set of 2D medical scan projections 202 can have the same dimensions (e.g., can have the same number of pixels extending in the length-direction and the same number of pixels extending the width-direction) as each other, but different projections in the set of 2D medical scan projections 202 can depict/illustrate different views, different perspectives, and/or different angles of the anatomical structure. As those having ordinary skill in the art will appreciate, such different views, perspectives, and/or angles can be due to focal sweeping performed by the medical scanning device 104 during its operation.

As those having ordinary skill in the art will appreciate, the type of projections contained in the set of 2D medical scan projections 202 can depend upon the type of electromagnetic radiation that the medical scanning device 104 uses to scan patients. For example, if the medical scanning device 104 is an X-ray scanner, then each projection in the set of 2D medical scan projections 202 can be an X-ray projection. As another example, if the medical scanning device 104 is a CT scanner, then each projection in the set of 2D medical scan projections 202 can be a CT projection. As yet another example, if the medical scanning device 104 is a PET scanner, then each projection in the set of 2D medical scan projections 202 can be a PET projection. As still another example, if the medical scanning device 104 is an MRI scanner, then each projection in the set of 2D medical scan projections 202 can be an MRI projection.

Figure 3:
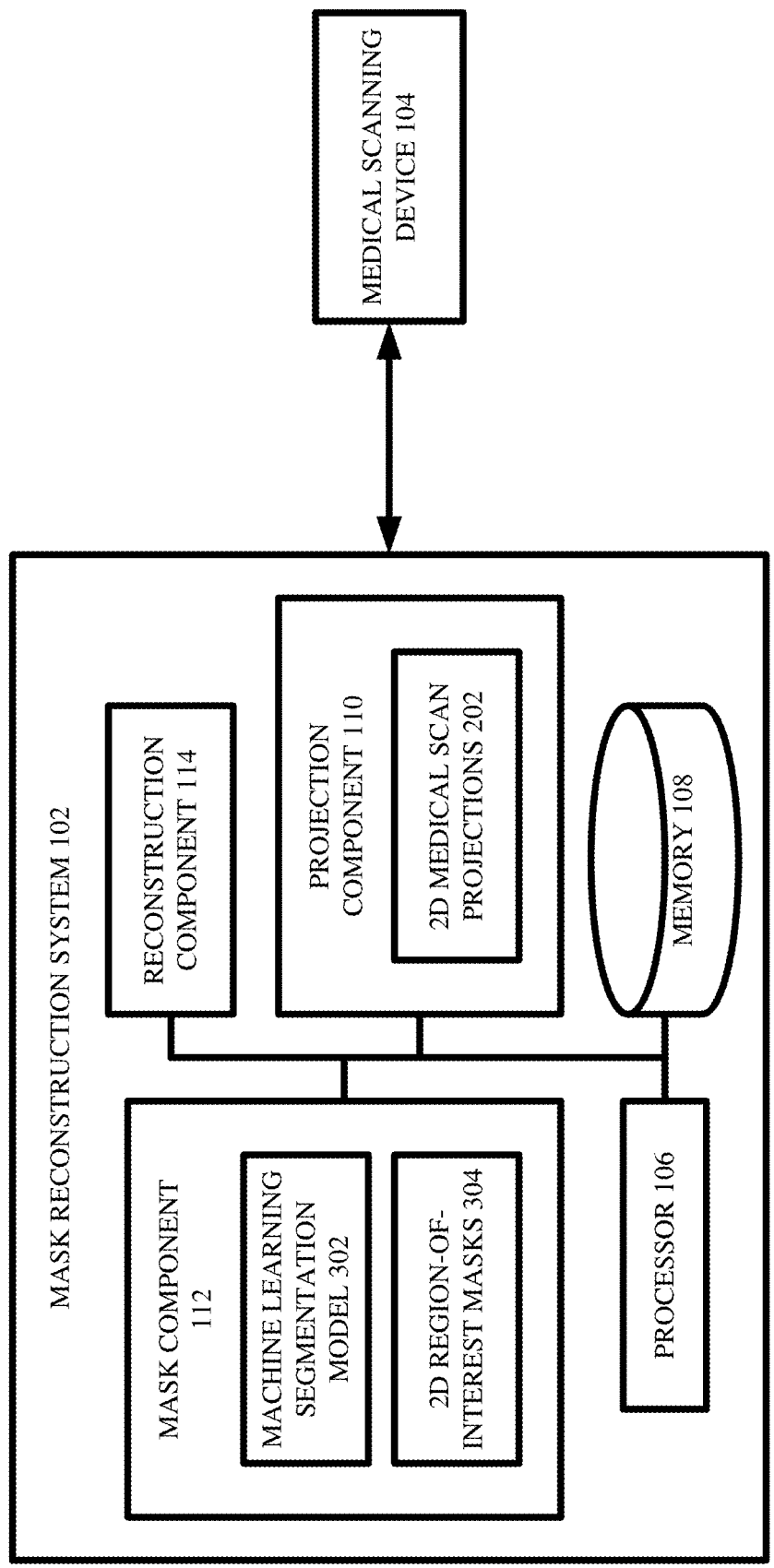
FIG. 3 illustrates a block diagram of an example, non-limiting system including a machine learning segmentation model and a set of 2D region-of-interest masks that facilitates AI-based region-of-interest masks for improved data reconstruction in accordance with one or more embodiments described herein.

FIG. 3 illustrates a block diagram of an example, non-limiting system 300 including a machine learning segmentation model and a set of 2D region-of-interest masks that can facilitate AI-based region-of-interest masks for improved data reconstruction in accordance with one or more embodiments described herein. As shown, the system 300 can, in some cases, comprise the same components as the system 200, and can further comprise a machine learning segmentation model 302 and a set of 2D region-of-interest masks 304.

In various embodiments, the mask component 112 can electronically maintain and/or electronically control the machine learning segmentation model 302. In various aspects, the machine learning segmentation model 302 can exhibit any suitable machine learning architecture. As a non-limiting example, the machine learning segmentation model 302 can exhibit a deep learning neural network architecture. In such case, the machine learning segmentation model 302 can comprise any suitable number of neural network layers, can comprise any suitable numbers of neurons in various layers (e.g., different layers can have the same and/or different numbers of neurons as each other), can comprise any suitable activation functions (e.g., sigmoid, softmax, hyperbolic tangent, rectified linear unit) in various neurons (e.g., different neurons can have the same and/or different activation functions as each other), and/or can comprise any suitable interneuron connectivity patterns (e.g., forward connections, skip connections, recurrent connections).

In various instances, the machine learning segmentation model 302 can be trained (e.g., via supervised training, unsupervised training, and/or reinforcement learning) to segment 2D medical scan projections so as to identify one or more regions-of-interest in such 2D medical scan projections. More specifically, in various cases, the machine learning segmentation model 302 can be configured and/or structured such that the machine learning segmentation model 302 can receive as input a given 2D medical scan projection that depicts an anatomical structure of a patient and can produce as output a given segmentation based on the given 2D medical scan projection. In some aspects, the given segmentation can be a hard pixel-wise mask that indicates which, if any, pixels of the given 2D medical scan projection belong to a region-of-interest of the anatomical structure. In other aspects, the given segmentation can be a soft pixel-wise mask that indicates probabilities of pixels of the given 2D medical scan projection belonging to a region-of-interest of the anatomical structure. In any case, the given segmentation can have the same dimensions/dimensionality as the given 2D medical scan projection (e.g., since the given 2D medical scan projection can be a two-dimensional pixel array, the given segmentation can likewise be a two-dimensional pixel array having the same number and/or arrangement of pixels as the given 2D medical scan projection). Accordingly, the given segmentation can be referred to as a 2D region-of-interest mask.

Thus, in various instances, the mask component 112 can electronically execute the machine learning segmentation model 302 on each of the set of 2D medical scan projections 202, thereby yielding the set of 2D region-of-interest masks 304. This is further explained with respect to FIGS. 4-5.

Figure 4:
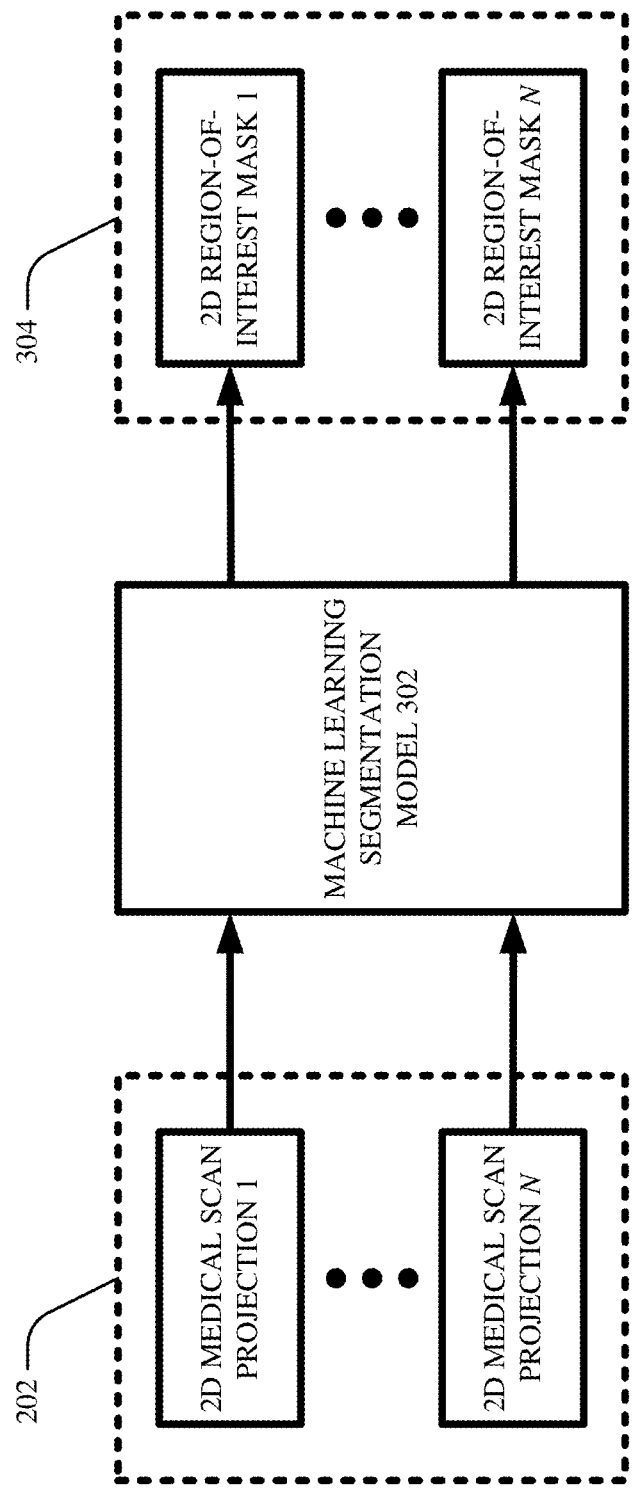
FIGS. 4-5 illustrate example and non-limiting ways in which a machine learning segmentation model can generate a set of 2D region-of-interest masks based on a set of 2D medical scan projections in accordance with one or more embodiments described herein.
Figure 5:
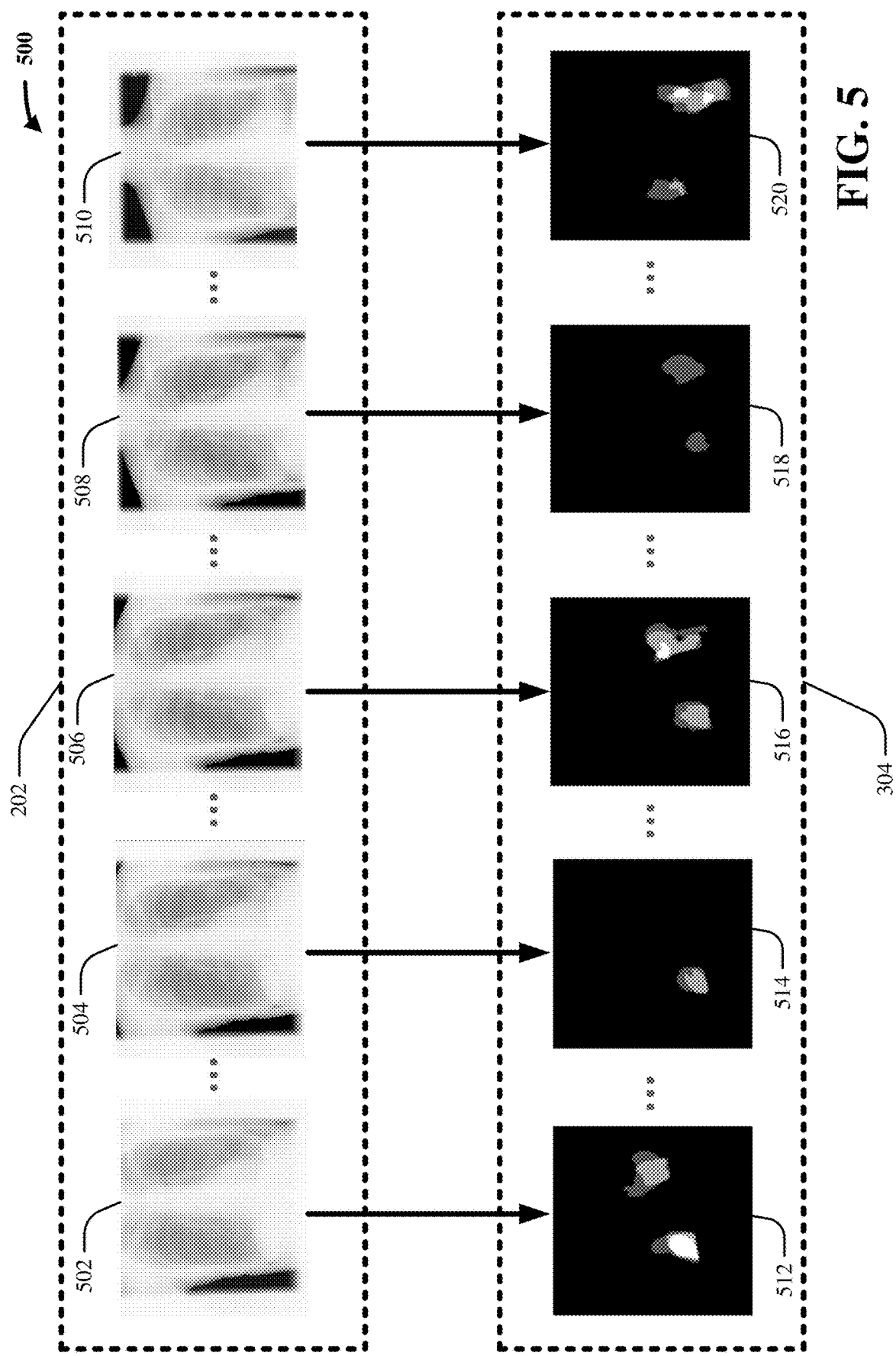

FIGS. 4-5 illustrate example and non-limiting ways in which the machine learning segmentation model 302 can generate the set of 2D region-of-interest masks 304 based on the set of 2D medical scan projections 202 in accordance with one or more embodiments described herein.

As shown in FIG. 4, the set of 2D medical scan projections 202 can comprise n projections for any suitable positive integer n. That is, the set of 2D medical scan projections 202 can comprise a 2D medical scan projection 1 to a 2D medical scan projection n. As mentioned above, each projection in the set of 2D medical scan projections 202 can be a two-dimensional pixel array, and different projections in the set of 2D medical scan projections 202 can have the same dimensionality as each other (e.g., can have the same number and arrangement of pixels as each other). For example, in various cases, the 2D medical scan projection 1 can be an x-by-y array of pixels, for any suitable positive integers x and y, and the 2D medical scan projection n can likewise be an x-by-y array of pixels. As also mentioned above, each projection in the set of 2D medical scan projections 202 can depict and/or illustrate the anatomical structure of the patient from a different and/or unique perspective view. Thus, different projections in the set of 2D medical scan projections 202 can exhibit different pixel values as compared to each other, where such pixel values can represent and/or be otherwise associated with recorded electromagnetic radiation levels (e.g., Hounsfield units).

As shown in FIG. 4, the mask component 112 can execute the machine learning segmentation model 302 on each of the set of 2D medical scan projections 202, so as to yield the set of 2D region-of-interest masks 304, where the set of 2D region-of-interest masks 304 can respectively correspond to the set of 2D medical scan projections 202. In other words, since the set of 2D medical scan projections 202 can include n projections, the set of 2D region-of-interest masks 304 can likewise include n masks: a 2D region-of-interest mask 1 to a 2D region-of-interest mask n.

More specifically, in various cases, the machine learning segmentation model 302 can receive as input the 2D medical scan projection 1 and can produce as output the 2D region-of-interest mask 1 based on the 2D medical scan projection 1. In various aspects, since the 2D medical scan projection 1 can be an x-by-y pixel array that depicts/illustrates a unique perspective view of the anatomical structure of the patient, the 2D region-of-interest mask 1 can be an x-by-y hard mask, the values of which indicate whether respective pixels of the 2D medical scan projection 1 belong to a region-of-interest of the anatomical structure. For example, if the machine learning segmentation model 302 determines and/or concludes that a pixel (i,j), for any suitable indices i and j, of the 2D medical scan projection 1 belongs to and/or is otherwise part of a region-of-interest (e.g., a disease portion) of the anatomical structure of the patient, the pixel (i,j) of the 2D region-of-interest mask 1 can have a value of 1 (e.g., where 1 can represent a region-of-interest class, and where 0 can represent a background class). On the other hand, if the machine learning segmentation model 302 determines and/or concludes that the pixel (i,j) of the 2D medical scan projection 1 does not belong to and/or is otherwise not part of a region-of-interest of the anatomical structure of the patient, the pixel (i,j) of the 2D region-of-interest mask 1 can have a value of 0 (e.g., again, where 1 can represent a region-of-interest class, and where 0 can represent a background class).

In various other cases, since the 2D medical scan projection 1 can be an x-by-y pixel array that depicts/illustrates a unique perspective view of the anatomical structure of the patient, the 2D region-of-interest mask 1 can be an x-by-y soft mask, the values of which indicate probabilities and/or likelihoods of respective pixels of the 2D medical scan projection 1 belonging to a region-of-interest of the anatomical structure. For example, if the machine learning segmentation model 302 determines and/or concludes that the pixel (i,j) of the 2D medical scan projection 1 is 80% likely to belong to a region-of-interest of the anatomical structure of the patient, the pixel (i,j) of the 2D region-of-interest mask 1 can have a value of 0.8 (e.g., where 0 can represent no likelihood of belonging to the region-of-interest, and where 1 can represent 100% likelihood of belonging to the region-of-interest). On the other hand, if the machine learning segmentation model 302 determines and/or concludes that the pixel (i,j) of the 2D medical scan projection 1 is only 15% likely to belong to a region-of-interest of the anatomical structure of the patient, the pixel (i,j) of the 2D region-of-interest mask 1 can have a value of 0.15 (e.g., again, where 0 can represent no likelihood of belonging to the region-of-interest, and where 1 can represent 100% likelihood of belonging to the region-of-interest).

Just as above, in various aspects, the machine learning segmentation model 302 can receive as input the 2D medical scan projection n and can produce as output the 2D region-of-interest mask n based on the 2D medical scan projection n. In various aspects, since the 2D medical scan projection n can be an x-by-y pixel array that depicts/illustrates a unique perspective view of the anatomical structure of the patient, the 2D region-of-interest mask n can be an x-by-y hard mask, the values of which indicate whether respective pixels of the 2D medical scan projection n belong to a region-of-interest of the anatomical structure. For example, if the machine learning segmentation model 302 determines and/or concludes that a pixel (i,j), for any suitable indices i and j, of the 2D medical scan projection n belongs to and/or is otherwise part of a region-of-interest (e.g., a disease portion) of the anatomical structure of the patient, the pixel (i,j) of the 2D region-of-interest mask n can have a value of 1 (e.g., where 1 can represent a region-of-interest class, and where 0 can represent a background class). On the other hand, if the machine learning segmentation model 302 determines and/or concludes that the pixel (i,j) of the 2D medical scan projection n does not belong to and/or is otherwise not part of a region-of-interest of the anatomical structure of the patient, the pixel (i,j) of the 2D region-of-interest mask n can have a value of 0 (e.g., again, where 1 can represent a region-of-interest class, and where 0 can represent a background class).

In various other cases, since the 2D medical scan projection n can be an x-by-y pixel array that depicts/illustrates a unique perspective view of the anatomical structure of the patient, the 2D region-of-interest mask n can be an x-by-y soft mask, the values of which indicate probabilities and/or likelihoods of respective pixels of the 2D medical scan projection n belonging to a region-of-interest of the anatomical structure. For example, if the machine learning segmentation model 302 determines and/or concludes that the pixel (i,j) of the 2D medical scan projection n is 67% likely to belong to a region-of-interest of the anatomical structure of the patient, the pixel (i,j) of the 2D region-of-interest mask n can have a value of 0.67 (e.g., where 0 can represent no likelihood of belonging to the region-of-interest, and where 1 can represent 100% likelihood of belonging to the region-of-interest). On the other hand, if the machine learning segmentation model 302 determines and/or concludes that the pixel (i,j) of the 2D medical scan projection n is only 9% likely to belong to a region-of-interest of the anatomical structure of the patient, the pixel (i,j) of the 2D region-of-interest mask n can have a value of 0.09 (e.g., again, where 0 can represent no likelihood of belonging to the region-of-interest, and where 1 can represent 100% likelihood of belonging to the region-of-interest).

Those having ordinary skill in the art will appreciate that the above-mentioned pixel values and/or probability values are non-limiting examples. In various cases, any suitable pixel values and/or pixel value ranges can be implemented as desired.

In various instances, the machine learning segmentation model 302 can be executed on the set of 2D medical scan projections 202 one at a time. In various other instances, the machine learning segmentation model 302 can be executed on the set of 2D medical scan projections 202 more than one at a time. In other words, the machine learning segmentation model 302 can, in some cases, be configured to receive as input multiple (e.g., two or more) projections at once and to produce as output multiple region-of-interest masks at once. Indeed, in such embodiments, the machine learning segmentation model 302 can learn how to correlate such multiple projections, so as to produce improved region-of-interest masks. Moreover, if the multiple projections that the machine learning segmentation model 302 receives as input are neighboring projections, the outputted masks can be even further improved and/or even more accurate.

FIG. 5 illustrates a non-limiting example of the set of 2D medical scan projections 202 and the set of 2D region-of-interest masks 304. As shown in FIG. 5, the set of 2D medical scan projections 202 can be a set of X-ray projections that depict/illustrate various views of the chest/torso of a patient. As shown, a projection 502 can depict/illustrate the chest/torso of the patient, a projection 504 can depict/illustrate the chest/torso of the patient from an upward-shifted view as compared to the projection 502, a projection 506 can depict/illustrate the chest/torso of the patient from an upward-shifted view as compared to the projection 504, a projection 508 can depict/illustrate the chest/torso of the patient from an upward-shifted view as compared to the projection 506, and/or a projection 510 can depict/illustrate the chest/torso of the patient from an upward-shifted view as compared to the projection 508.

As also shown in FIG. 5, the set of 2D region-of-interest masks 304 can be a set of pixel-wise masks that show probabilities of belonging to a region-of-interest (e.g., scarred and/or diseased lung tissue) of the chest/torso of the patient. More specifically, the machine learning segmentation model 302 can execute on the projection 502, so as to yield a region-of-interest mask 512. In various cases, darker colors/shades in the region-of-interest mask 512 can indicate pixels of the projection 502 that have lower probabilities of belonging to and/or representing the region-of-interest, while lighter colors/shades in the region-of-interest mask 512 can indicate pixels of the projection 502 that have higher probabilities of belonging to and/or representing the region-of-interest.

Similarly, the machine learning segmentation model 302 can execute on the projection 504, so as to yield a region-of-interest mask 514. In various cases, darker colors/shades in the region-of-interest mask 514 can indicate pixels of the projection 504 that have lower probabilities of belonging to and/or representing the region-of-interest, while lighter colors/shades in the region-of-interest mask 514 can indicate pixels of the projection 504 that have higher probabilities of belonging to and/or representing the region-of-interest.

Likewise, the machine learning segmentation model 302 can execute on the projection 506, so as to yield a region-of-interest mask 516. In various cases, darker colors/shades in the region-of-interest mask 516 can indicate pixels of the projection 506 that have lower probabilities of belonging to and/or representing the region-of-interest, while lighter colors/shades in the region-of-interest mask 516 can indicate pixels of the projection 506 that have higher probabilities of belonging to and/or representing the region-of-interest.

In similar fashion, the machine learning segmentation model 302 can execute on the projection 508, so as to yield a region-of-interest mask 518. In various cases, darker colors/shades in the region-of-interest mask 518 can indicate pixels of the projection 508 that have lower probabilities of belonging to and/or representing the region-of-interest, while lighter colors/shades in the region-of-interest mask 518 can indicate pixels of the projection 508 that have higher probabilities of belonging to and/or representing the region-of-interest.

In like fashion, the machine learning segmentation model 302 can execute on the projection 510, so as to yield a region-of-interest mask 520. In various cases, darker colors/shades in the region-of-interest mask 520 can indicate pixels of the projection 510 that have lower probabilities of belonging to and/or representing the region-of-interest, while lighter colors/shades in the region-of-interest mask 520 can indicate pixels of the projection 510 that have higher probabilities of belonging to and/or representing the region-of-interest.

In any case, the mask component 112 can leverage the machine learning segmentation model 302 to generate the set of 2D region-of-interest masks 304 from the set of 2D medical scan projections 202.

Figure 6:
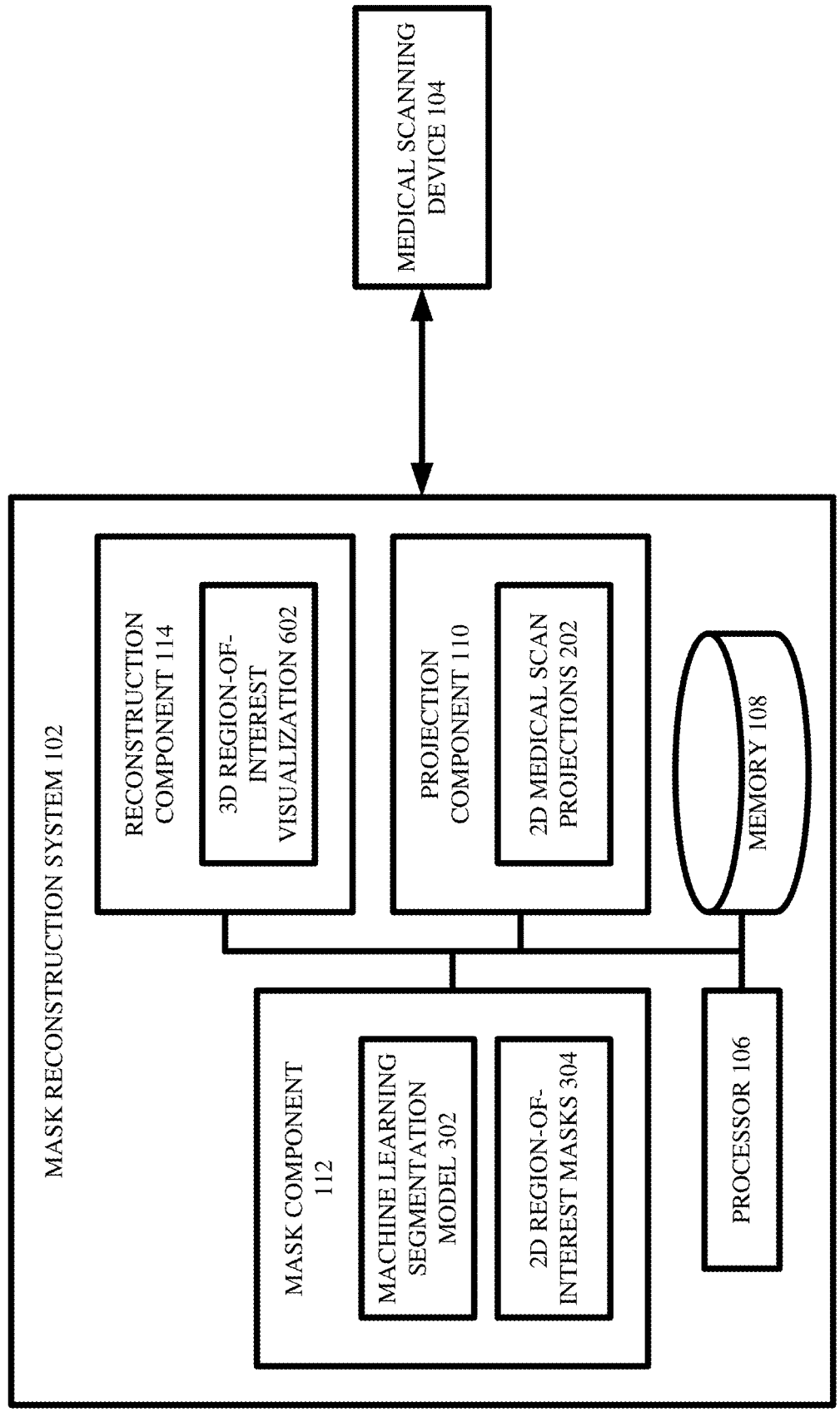
FIG. 6 illustrates a block diagram of an example, non-limiting system including a 3D region-of-interest visualization that facilitates AI-based region-of-interest masks for improved data reconstruction in accordance with one or more embodiments described herein.

FIG. 6 illustrates a block diagram of an example, non-limiting system 600 including a 3D region-of-interest visualization that can facilitate AI-based region-of-interest masks for improved data reconstruction in accordance with one or more embodiments described herein. As shown, the system 600 can, in some cases, comprise the same components as the system 300, and can further comprise a 3D region-of-interest visualization 602.

In various embodiments, the reconstruction component 114 can electronically generate the 3D region-of-interest visualization 602 based on both the set of 2D region-of-interest masks 304 and the set of 2D medical scan projections 202. In various aspects, the 3D region-of-interest visualization 602 can be considered as being a three-dimensional representation of the anatomical structure of the patient that visually emphasizes the region-of-interest of the anatomical structure. Thus, a medical professional who desires to diagnose and/or prognose the patient can manually view the 3D region-of-interest visualization 602 (e.g., can manually view slices of the 3D region-of-interest visualization 602) and can more easily see and/or notice the emphasized region-of-interest.

In various instances, the reconstruction component 114 can electronically generate the 3D region-of-interest visualization 602 in at least two different ways. In one or more first embodiments, the reconstruction component 114 can generate the 3D region-of-interest visualization 602 based on superimposition, as discussed with respect to FIGS. 7-10. In one or more second embodiments, the reconstruction component 114 can generate the 3D region-of-interest visualization 602 based on weighted reconstruction, as discussed with respect to FIGS. 11-18.

Figure 7:
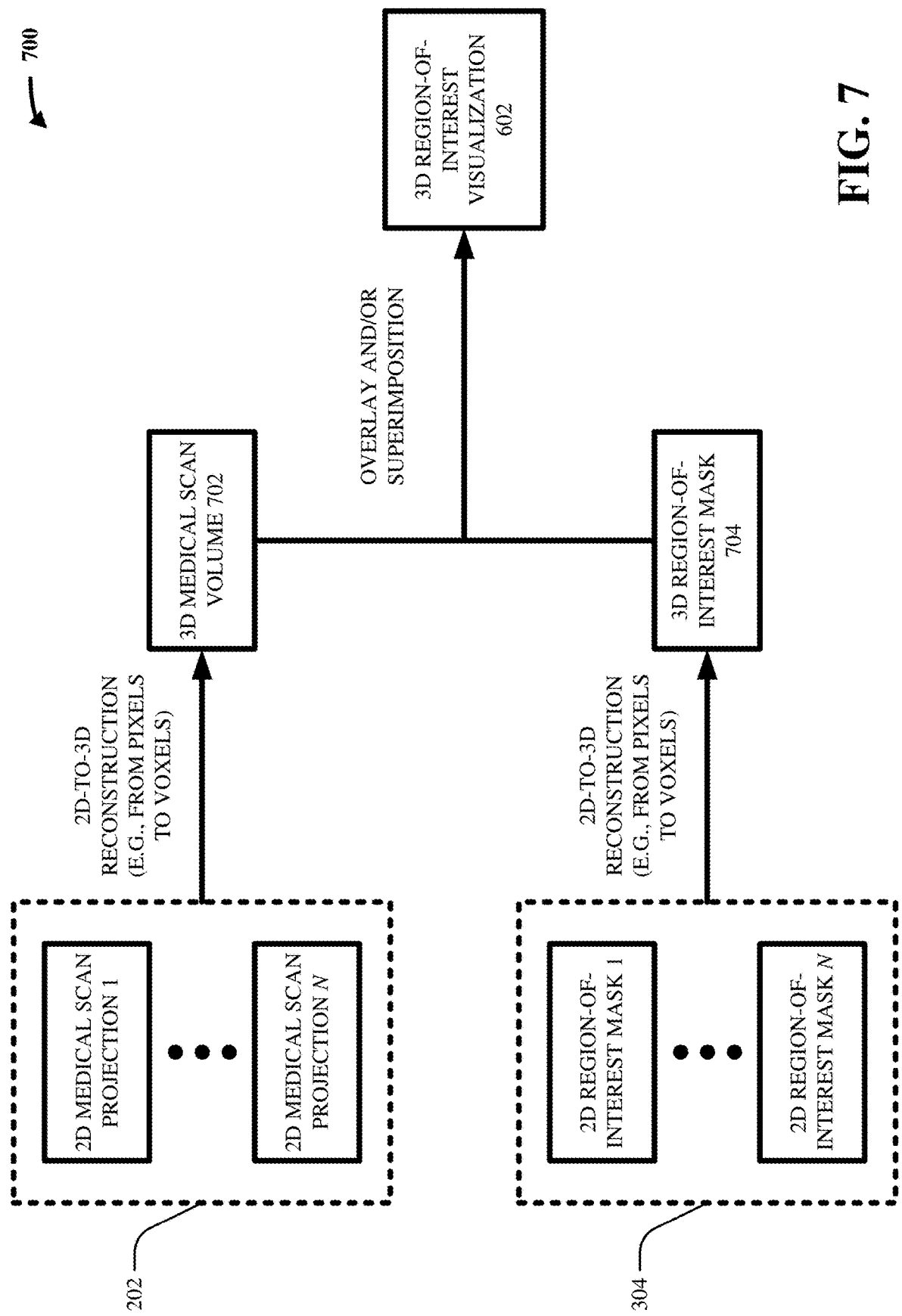
FIGS. 7-9 illustrate example and non-limiting ways in which a 3D region-of-interest visualization can be generated based on a set of 2D region-of-interest masks and a set of 2D medical scan projections, where the 3D region-of-interest visualization is formed via superimposition and/or overlaying, in accordance with one or more embodiments described herein.
Figure 8:
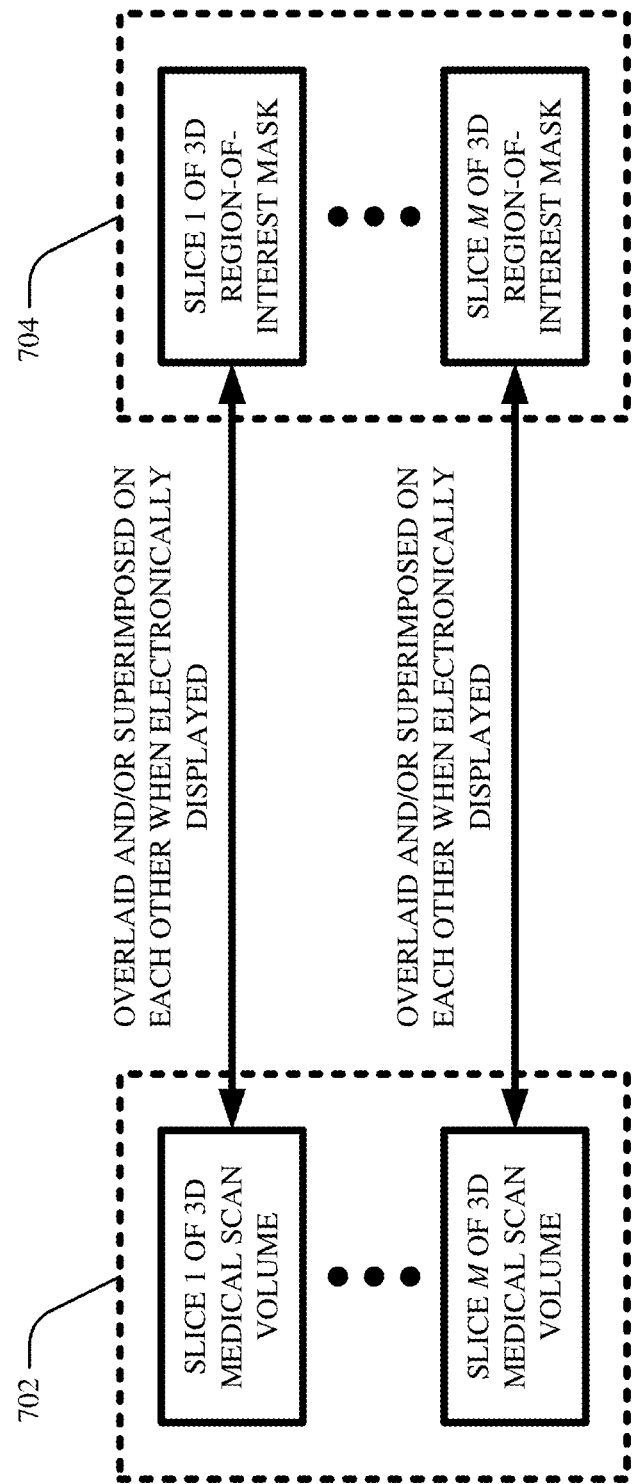
Figure 9:
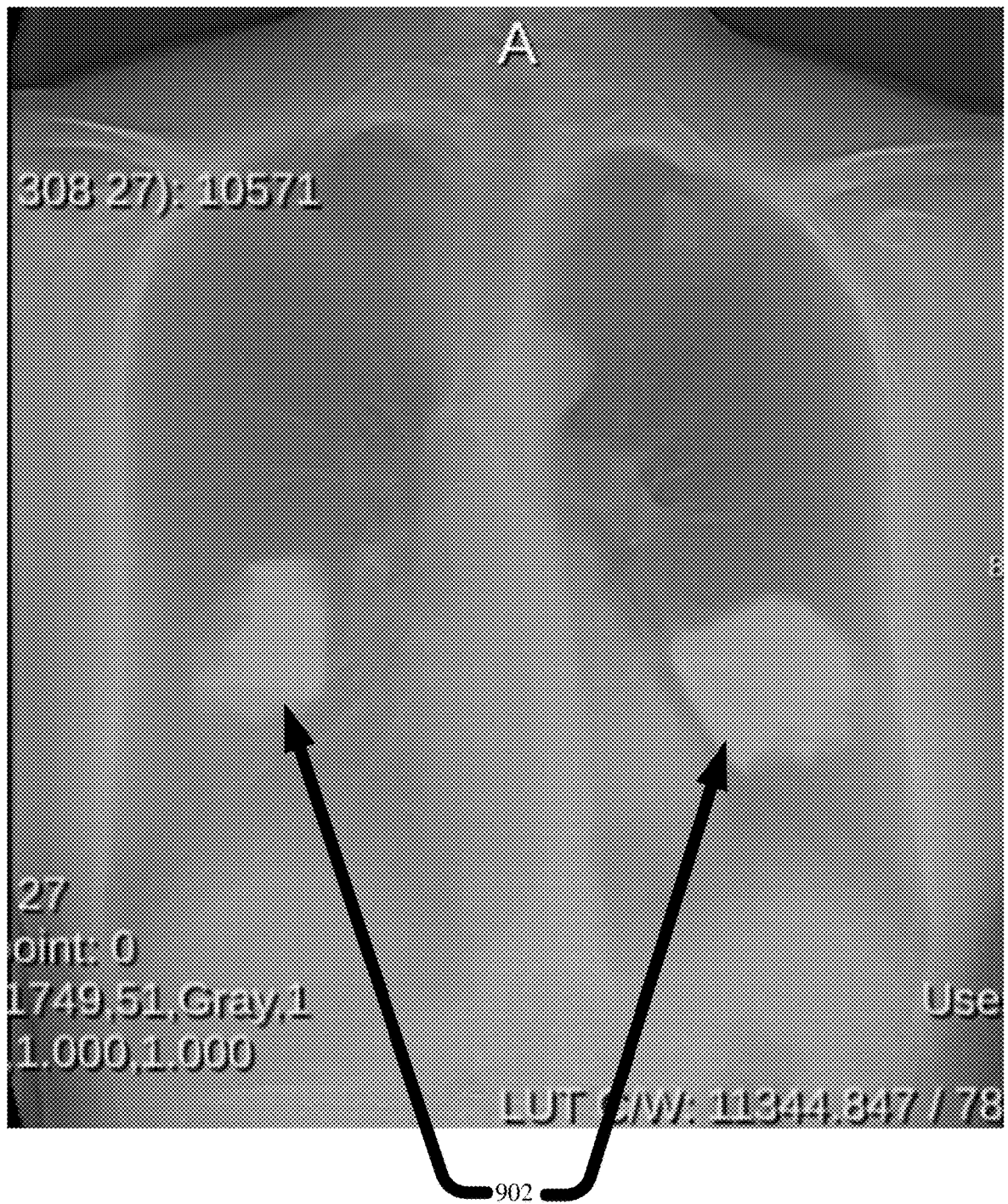

FIGS. 7-9 illustrate example and non-limiting ways in which the 3D region-of-interest visualization 602 can be generated based on the set of 2D region-of-interest masks 304 and the set of 2D medical scan projections 202, where the 3D region-of-interest visualization 602 is formed via superimposition and/or overlaying, in accordance with one or more embodiments described herein.

As shown in FIG. 7, in the one or more first embodiments, the reconstruction component 114 can electronically apply 2D-to-3D reconstruction to the set of 2D medical scan projections 202, thereby yielding a 3D medical scan volume 702. As mentioned above, each projection in the set of 2D medical scan projections 202 can be a two-dimensional pixel array that depicts/illustrates a unique perspective/view of the anatomical structure of the patient. Accordingly, in various cases, the 3D medical scan volume 702 can be a voxel array that depicts a three-dimensional version of the anatomical structure of the patient, which three-dimensional version is constructed and/or built from the various pixel arrays and/or two-dimensional versions of the anatomic structure that are shown by the set of 2D medical scan projections 202.

In various instances, the 2D-to-3D reconstruction can be any suitable type of image reconstruction technique. For example, in some cases, the 2D-to-3D reconstruction can be analytical image reconstruction, such as filtered back projection. As another example, in some cases, the 2D-to-3D reconstruction can be iterative image reconstruction, such as algebraic reconstruction, iterative Sparse Asymptotic Minimum Variance, statistical reconstruction, and/or learned (e.g., model-based) reconstruction.

As also shown in FIG. 7, the reconstruction component 114 can electronically apply 2D-to-3D reconstruction to the set of 2D region-of-interest masks 304, thereby yielding a 3D region-of-interest mask 704. As mentioned above, each mask in the set of 2D region-of-interest masks 304 can indicate which pixels of a respectively corresponding projection from the set of 2D medical scan projections 202 belong to and/or are likely to belong to the region-of-interest of the anatomical structure. Accordingly, in various cases, the 3D region-of-interest mask 704 can be a voxel array that indicates which voxels of the 3D medical scan volume 702 belong to and/or are likely to belong to the region-of-interest of the anatomical structure, that is constructed and/or built from the various two-dimensional versions of the region-of-interest that are shown by the set of 2D region-of-interest masks 304. If each of the set of 2D region-of-interest masks 304 is a hard mask, the 3D region-of-interest mask 704 can likewise be a hard mask (e.g., the voxel values of the 3D region-of-interest mask 704 can indicate which voxels of the 3D medical scan volume 702 belong to the region-of-interest). On the other hand, if each of the set of 2D region-of-interest masks 304 is a soft mask, the 3D region-of-interest mask 704 can likewise be a soft mask (e.g., the voxel values of the 3D region-of-interest mask 704 can indicate probabilities of respective voxels of the 3D medical scan volume 702 belonging to the region-of-interest).

In various aspects, just as above, any suitable image reconstruction technique can be utilized to construct the 3D region-of-interest mask 704 from the set of 2D region-of-interest masks 304. As a non-limiting example in which each of the set of 2D region-of-interest masks 304 is a soft mask, the following formula can be used to reconstruct the 3D region-of-interest mask 704:

$$P(x, y, z) = \frac{\sum_{i=1}^{M} Q_i}{N'(x, y, z)}$$

where P(x,y,z) can represent the probability value to be assigned to the reconstructed voxel of the 3D region-of-interest mask 704, which reconstructed voxel represents a location (x,y) for a slice z; where N' can represent the number of projections in the set of 2D medical scan projections 202 that contribute to and/or otherwise depict/ illustrate the location (x,y) for the slice z; where M can represent the number of masks in the set of 2D region-of-interest masks 304 that indicate non-zero pixel-level probabilities of the location (x,y) for the slice z belonging to the region-of-interest; where $Q_i$ can represent the pixel-level probability that the location (x,y) for the slice z belongs to the region-of-interest as indicated by a 2D region-of-interest mask i; and where T can represent a threshold probability level for normalization purposes. In some cases, T can be set to 50% (e.g., 0.5) so as to suppress and/or dilute the influence of any 2D region-of-interest mask that indicates that the location (x,y) for the slice z has a less than 50% likelihood of belonging to the region-of-interest. In various other cases, T can be set to any other suitable percentage as desired.

In various aspects, as shown in FIG. 7, the reconstruction component 114 can generate the 3D region-of-interest visualization 602 by overlaying and/or superimposing the 3D region-of-interest mask 704 onto the 3D medical scan volume 702. In other words, the reconstruction component 114 can overlay and/or superimpose slices of the 3D region-of-interest mask 704 onto respective slices of the 3D medical scan volume 702, and the result can be considered as the 3D region-of-interest visualization 602. This is further shown in FIG. 8.

As shown in FIG. 8, the 3D medical scan volume 702 can, after reconstruction, be broken up into m two-dimensional slices, for any suitable positive integer m (e.g., slice 1 of 3D medical scan volume to slice m of 3D medical scan volume). Similarly, the 3D region-of-interest mask 704 can, after reconstruction, be broken up into m two-dimensional slices (e.g., slice 1 of 3D region-of-interest mask to slice m of 3D region-of-interest mask). Accordingly, in various instances, the reconstruction component 114 can superimpose and/or overlay the slices of the 3D region-of-interest mask 704 onto and/or over top of respective slices of the 3D medical scan volume 702. For example, if the reconstruction component 114 electronically renders and/or displays the slice 1 of the 3D medical scan volume 702, the reconstruction component 114 can simultaneously render the slice 1 of the 3D region-of-interest mask 704 over and/or on top of the slice 1 of the 3D medical scan volume 702. Thus, the slice 1 of the 3D region-of-interest mask 704 and the slice 1 of the 3D medical scan volume 702 can together create a visual effect by which the anatomical structure of the patient is visible, depicted, and/or otherwise illustrated by the slice 1 of the 3D medical scan volume 702, and by which the region-of-interest of the anatomical structure is visually emphasized and/or highlighted by the slice 1 of the 3D region-of-interest mask 704. As another example, if the reconstruction component 114 electronically renders and/or displays the slice m of the 3D medical scan volume 702, the reconstruction component 114 can simultaneously render the slice m of the 3D region-of-interest mask 704 over and/or on top of the slice m of the 3D medical scan volume 702. Thus, the slice m of the 3D region-of-interest mask 704 and the slice m of the 3D medical scan volume 702 can together create a visual effect by which the anatomical structure of the patient is visible, depicted, and/or otherwise illustrated by the slice m of the 3D medical scan volume 702, and by which the region-of-interest of the anatomical structure is visually emphasized and/or highlighted by the slice m of the 3D region-of-interest mask 704.

FIG. 9 shows a non-limiting example of such a superimposition. As shown in FIG. 9, an X-ray slice 900 of a patient's chest/torso is visible, and regions-of-interest 902 are visually emphasized by superimposition.

In various embodiments, the reconstruction component 114 can electronically determine/conclude an overall likelihood and/or probability of the region-of-interest being present in the anatomical structure of the patient, based on the 3D region-of-interest mask 704. More specifically, if the 3D region-of-interest mask 704 is a soft mask that exhibits voxel-wise probabilities of belonging to the region-of-interest, the reconstruction component 114 can identify the greatest and/or largest voxel-wise probability in the 3D region-of-interest mask 704, and the reconstruction component 114 can determine/conclude that the overall likelihood of the region-of-interest being present in the anatomical structure (e.g., within the 3D medical scan volume 702) is equal to and/or otherwise based on that greatest and/or largest voxel-wise probability. In other cases, the reconstruction component 114 can conclude that the region-of-interest is present and/or not present based on that greatest and/or largest voxel-wise probability (e.g., if the greatest voxel-wise probability is more than 50%, the reconstruction component 114 can conclude that the region-of-interest is present; if the greatest voxel-wise probability is less than 50%, the reconstruction component 114 can conclude that the region-of-interest is not present). In still other cases, the reconstruction component 114 can average all and/or any suitable subset of the voxel-wise probabilities indicated by the 3D region-of-interest mask 704, and the overall likelihood can be equal to and/or otherwise based on such average. In various aspects, the reconstruction component 114 can leverage the 3D region-of-interest mask 704 in any other suitable fashion so as to determine whether the region-of-interest is present in the anatomical structure of the patient and/or so as to estimate a probability of the region-of-interest being present in the anatomical structure of the patient.

Figure 10:
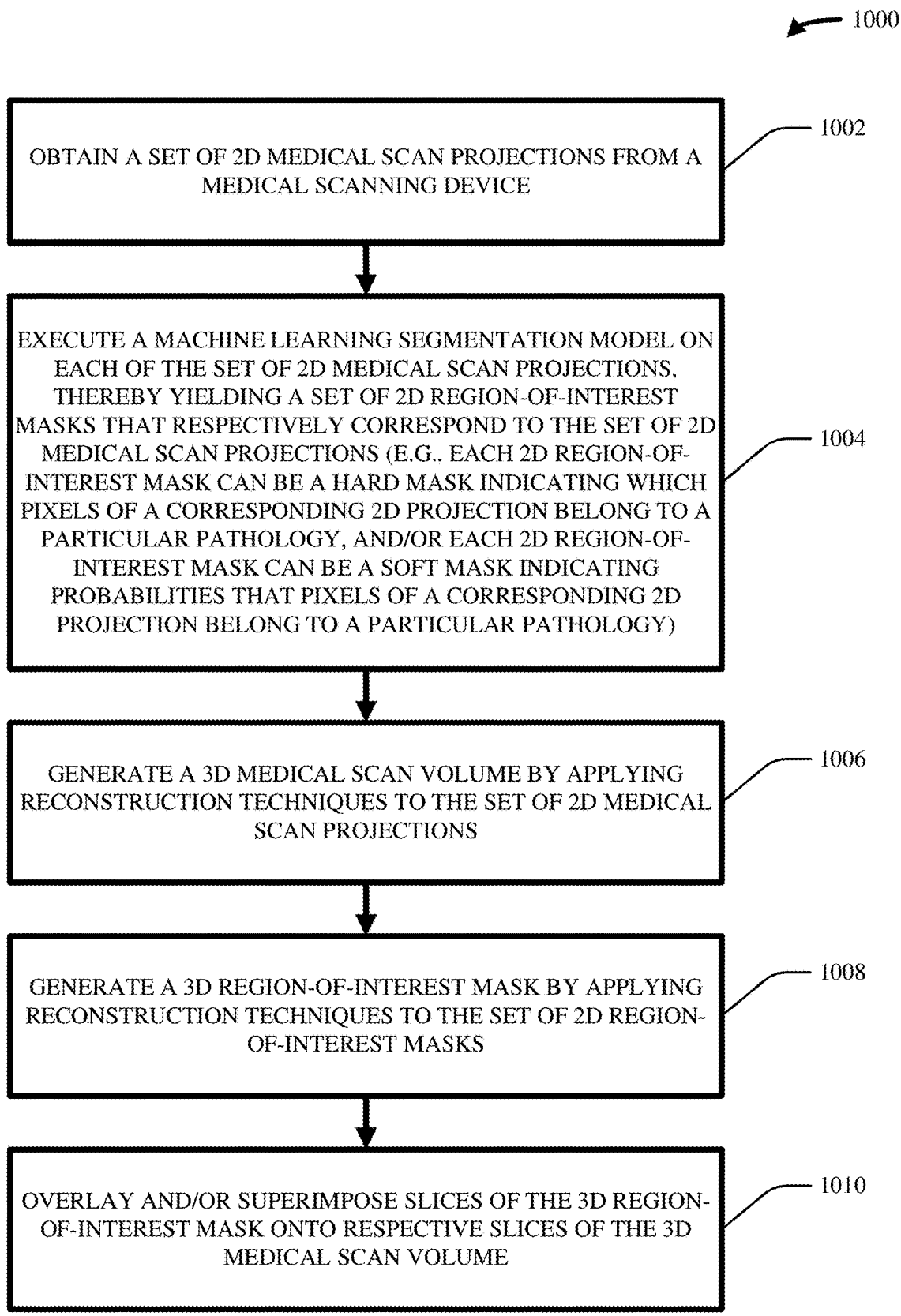
FIG. 10 illustrates a flow diagram of an example, non-limiting computer-implemented method that facilitates AI-based region-of-interest masks for improved data reconstruction by superimposition and/or overlay in accordance with one or more embodiments described herein.

FIG. 10 illustrates a flow diagram of an example, non-limiting computer-implemented method 1000 that can facilitate AI-based region-of-interest masks for improved data reconstruction by superimposition and/or overlay in accordance with one or more embodiments described herein. In various cases, the mask reconstruction system 102 can facilitate the computer-implemented method 1000.

In various embodiments, act 1002 can include obtaining, by a device (e.g., 110) operatively coupled to a processor, a set of 2D medical scan projections (e.g., 202) from a medical scanning device (e.g., 104).

In various aspects, act 1004 can include executing, by the device (e.g., 112), a machine learning segmentation model (e.g., 302) on each of the set of 2D medical scan projections, thereby yielding a set of 2D region-of-interest masks (e.g., 304) that respectively correspond to the set of 2D medical scan projections. In various cases, each 2D region-of-interest mask can be a hard mask indicating which pixels, if any, of a corresponding 2D projection belong to a particular pathology region of a depicted anatomical structure. In various other cases, each 2D region-of-interest mask can be a soft mask indicating probabilities that pixels of a corresponding 2D projection belong to a particular pathology region of a depicted anatomical structure.

In various instances, act 1006 can include generating, by the device (e.g., 114), a 3D medical scan volume (e.g., 702) by applying reconstruction techniques to the set of 2D medical scan projections.

In various aspects, act 1008 can include generating, by the device (e.g., 114), a 3D region-of-interest mask (e.g., 704) by applying reconstruction techniques to the set of 2D region-of-interest masks.

In various instances, act 1010 can include overlaying and/or superimposing, by the device (e.g., 114), slices of the 3D region-of-interest mask onto respective slices of the 3D medical scan projection.

FIGS. 11-17 illustrate example and non-limiting ways in which the 3D region-of-interest visualization 602 can be generated based on the set of 2D region-of-interest masks 304 and the set of 2D medical scan projections 202, where the 3D region-of-interest visualization 602 is formed via weighted reconstruction, in accordance with one or more embodiments described herein.

Figure 11:
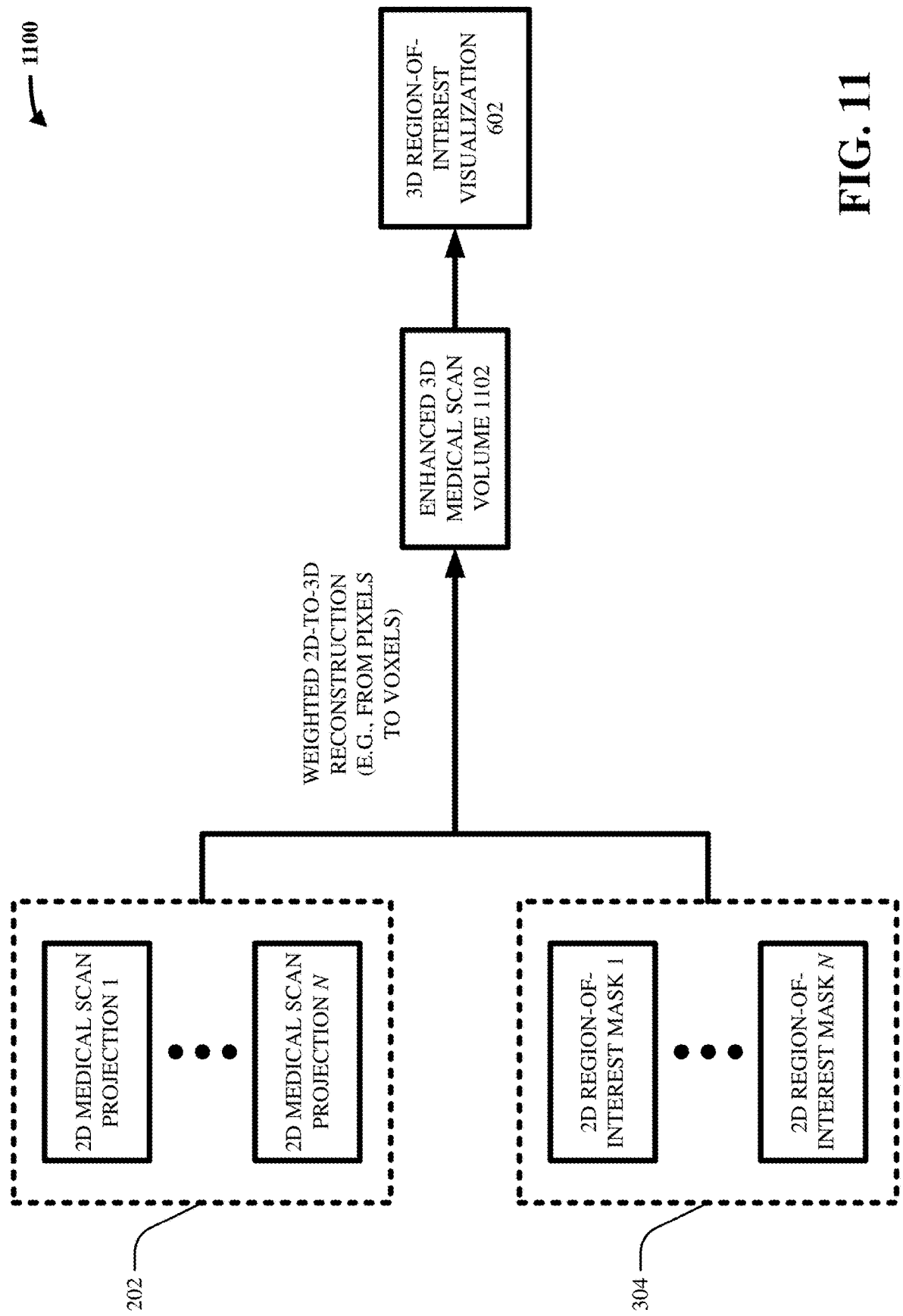
FIGS. 11-17 illustrate example and non-limiting ways in which a 3D region-of-interest visualization can be generated based on a set of 2D region-of-interest masks and a set of 2D medical scan projections, where the 3D region-of-interest visualization is formed via weighted reconstruction, in accordance with one or more embodiments described herein.

As shown in FIG. 11, in the one or more second embodiments, the reconstruction component 114 can electronically apply weighted 2D-to-3D reconstruction to the set of 2D medical scan projections 202 and to the set of 2D region-of-interest masks 304, thereby yielding an enhanced 3D medical scan volume 1102. As mentioned above, each projection in the set of 2D medical scan projections 202 can be a two-dimensional pixel array that depicts/illustrates a unique perspective/view of the anatomical structure of the patient. As also mentioned above, each mask in the set of 2D region-of-interest masks 304 can indicate which pixels of a respectively corresponding projection from the set of 2D medical scan projections 202 belong to and/or are likely to belong to the region-of-interest of the anatomical structure. Accordingly, in various cases, the enhanced 3D medical scan volume 1102 can be a voxel array that depicts a three-dimensional version of the anatomical structure of the patient where voxels that make up and/or are likely to make up the region-of-interest are emphasized, highlighted, and/or otherwise increased for added visual clarity, which three-dimensional version is constructed and/or built from the various pixel arrays that are shown by the set of 2D medical scan projections 202 and by the set of 2D region-of-interest masks 304.

In various instances, the weighted 2D-to-3D reconstruction can be any suitable type of image reconstruction technique. For example, in some cases, the weighted 2D-to-3D reconstruction can be analytical image reconstruction, such as filtered back projection. As another example, in some cases, the weighted 2D-to-3D reconstruction can be iterative image reconstruction, such as algebraic reconstruction, iterative Sparse Asymptotic Minimum Variance, statistical reconstruction, and/or learned (e.g., model-based) reconstruction.

An existing formula for facilitating unweighted 2D-to-3D image reconstruction is given as:

$$\text{Slice}_{Existing}(x, y, z) = \frac{\sum_{i=1}^{N'} \text{Projection}_i(x, y, z) * \text{Collimation}_i}{\sum_{i=1}^{N'} \text{Collimation}_i}$$

where $\text{Slice}_{Existing}(x,y,z)$ can represent the value (e.g., Hounsfield unit) to be assigned to the resulting reconstructed voxel which represents a location (x,y) for a slice z; where N' can represent the number of projections that contribute to and/or otherwise depict/illustrate the location (x,y) for the slice z; where $\text{Projection}_i(x,y,z)$ can represent a pixel value (e.g., Hounsfield unit) indicated by a projection i that contributes to the location (x,y) for the slice z; and where $\text{Collimation}_i$ can represent a reconstruction value indicated by a collimation mask for the location (x,y) for the slice z. As shown, the above existing formula does not include weighting by region-of-interest masks. Indeed, those having ordinary skill in the art will appreciate that a collimation mask is not equivalent to a region-of-interest mask as described herein.

As a non-limiting example in which each of the set of 2D region-of-interest masks 304 is a soft mask, the following formula can be used to reconstruct the enhanced 3D medical scan volume 1102 via weighted reconstruction:

$$\text{Slice}_{Enhanced}(x, y, z) = \frac{\sum_{i=1}^{N'} \text{Projection}_i(x, y, z) * \text{Collimation}_i + \sum_{i=1}^{M} \text{Projection}_i(x, y, z) * Q_i * f_{Weight}}{\sum_{i=1}^{N'} \text{Collimation}_i + \sum_{i=1}^{M} Q_i}$$

where $\text{Slice}_{Enhanced}(x,y,z)$ can represent the value (e.g., Hounsfield unit) to be assigned to a reconstructed voxel of the enhanced 3D medical scan volume 1102, which reconstructed voxel can represent a location (x,y) for a slice z; where N' can represent the number of projections in the set of 2D medical scan projections 202 that contribute to and/or otherwise depict/illustrate the location (x,y) for the slice z; where M can represent the number of masks in the set of 2D region-of-interest masks 304 that indicate non-zero pixel-level probabilities of belonging to the region-of-interest for the location (x,y) for a slice z; where $\text{Projection}_i(x,y,z)$ can represent a pixel value (e.g., Hounsfield unit) indicated by a 2D medical scan projection i for the location (x,y) for the slice z; where $\text{Collimation}_i$ can represent a reconstruction value indicated by a collimation mask for the location (x,y) for the slice z; where $Q_i$ can represent the pixel-level probability that the location (x,y) for the slice z belongs to the region-of-interest as indicated by a 2D region-of-interest mask i; and where $f_{weight}$ can be any suitable weighting coefficient (e.g., any suitable scalar). In other words, the reconstruction component 114 can combine a collimation mask with the set of 2D region-of-interest masks 304 to yield a weighting map, and the reconstruction component 114 can utilize the weighting map to build the enhanced 3D medical scan volume 1102 from the set of 2D medical scan projections 202.

Figure 12:
Figure 13:

FIGS. 12-17 illustrate non-limiting examples of slices of one or more enhanced 3D medical scan volume as compared to non-enhanced reconstructed slices. As shown, FIG. 12 and FIG. 13 each depict a two-dimensional slice of a reconstructed X-ray volume showing a first patient's chest/torso. FIG. 12 was obtained via existing reconstruction techniques, whereas FIG. 13 was obtained via weighted reconstruction as described herein. One of ordinary skill in the art will realize through visual comparison of FIGS. 12-13 that FIG. 12 does not visually emphasize and/or highlight a disease region (e.g., COVID-19 scarring in lungs) of the first patient's chest/torso, whereas FIG. 13 does visually emphasize/highlight the disease region.

Figure 14:
Figure 15:

Similarly, as shown, FIG. 14 and FIG. 15 each depict a two-dimensional slice of a reconstructed X-ray volume showing a second patient's chest/torso. FIG. 14 was obtained via existing reconstruction techniques, whereas FIG. 15 was obtained via weighted reconstruction as described herein. One of ordinary skill in the art will realize through visual comparison of FIGS. 14-15 that FIG. 14 does not visually emphasize and/or highlight a disease region of the second patient's chest/torso, whereas FIG. 15 does visually emphasize/highlight the disease region.

Figure 16:
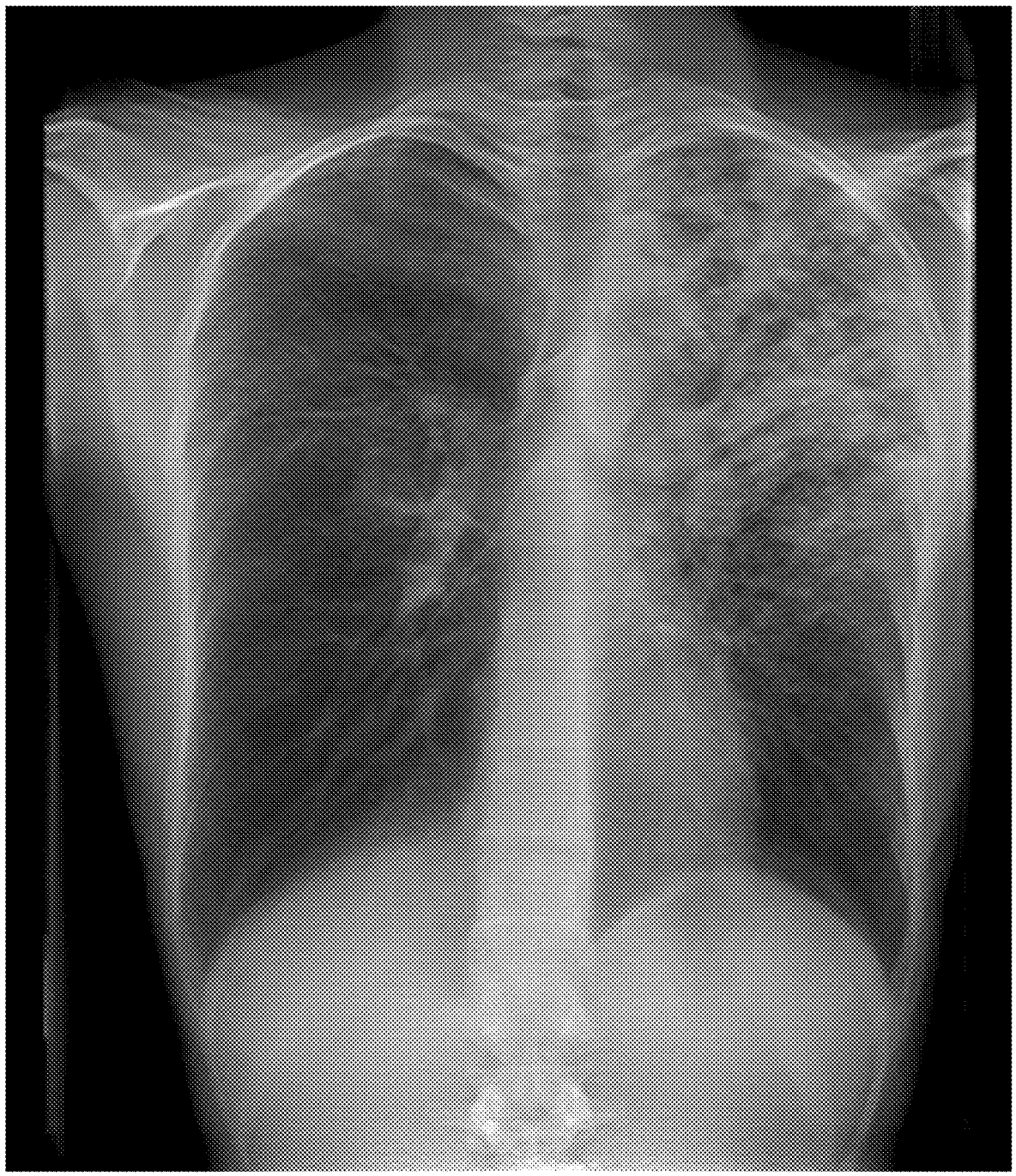
Figure 17:
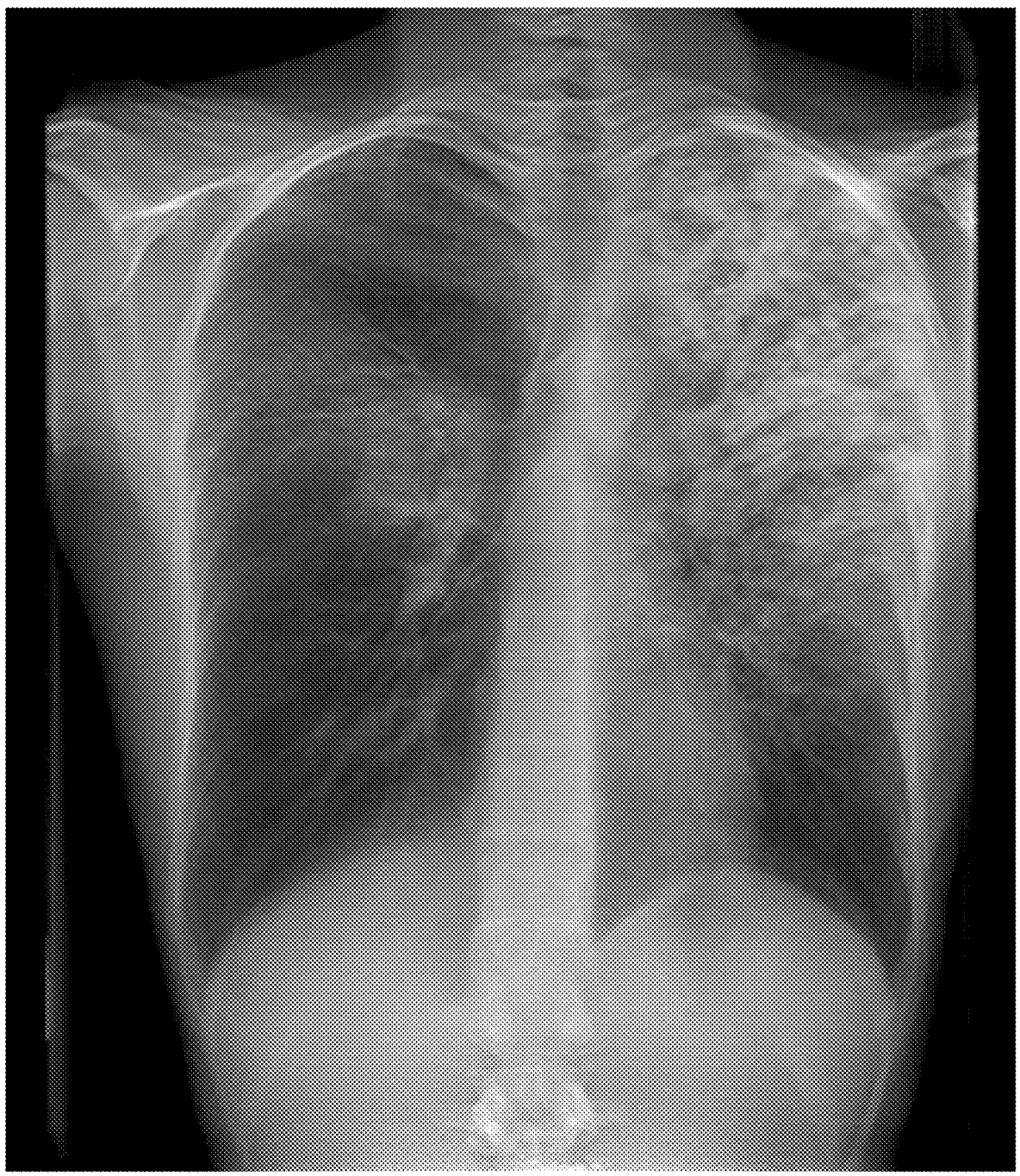

Likewise, as shown, FIG. 16 and FIG. 17 each depict a two-dimensional slice of a reconstructed X-ray volume showing a third patient's chest/torso. FIG. 16 was obtained via existing reconstruction techniques, whereas FIG. 17 was obtained via weighted reconstruction as described herein. One of ordinary skill in the art will realize through visual comparison of FIGS. 16-17 that FIG. 16 does not visually emphasize and/or highlight a disease region of the third patient's chest/torso, whereas FIG. 17 does visually emphasize/highlight the disease region.

Thus, FIGS. 12-17 show a real-world benefit obtained by various embodiments described herein (e.g., improved visualization of patient pathology in reconstructed slices).

In any case, the reconstruction component 114 can build the enhanced 3D medical scan volume 1102 via weighted reconstruction based on both the set of 2D medical scan projections 202 and the set of 2D region-of-interest masks 304. In various aspects, the enhanced 3D medical scan volume 1102 can be considered as the 3D region-of-interest visualization 602.

Figure 18:
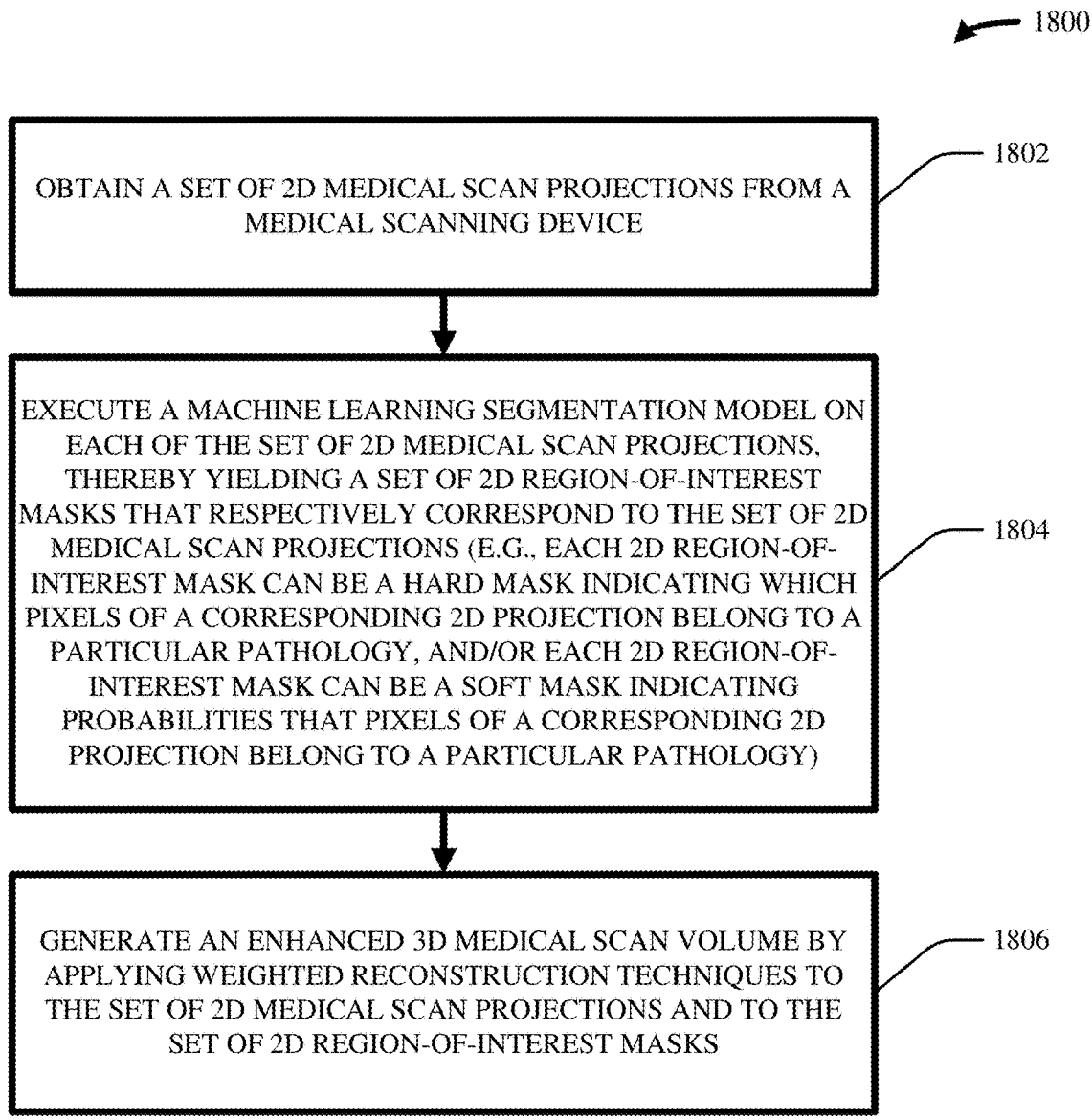
FIG. 18 illustrates a flow diagram of an example, non-limiting computer-implemented method that facilitates AI-based region-of-interest masks for improved data reconstruction by weighted reconstruction in accordance with one or more embodiments described herein.

FIG. 18 illustrates a flow diagram of an example, non-limiting computer-implemented method 1800 that can facilitate AI-based region-of-interest masks for improved data reconstruction by weighted reconstruction in accordance with one or more embodiments described herein. In various cases, the mask reconstruction system 102 can facilitate the computer-implemented method 1800.

In various embodiments, act 1802 can include obtaining, by a device (e.g., 110) operatively coupled to a processor, a set of 2D medical scan projections (e.g., 202) from a medical scanning device (e.g., 104).

In various aspects, act 1804 can include executing, by the device (e.g., 112), a machine learning segmentation model (e.g., 302) on each of the set of 2D medical scan projections, thereby yielding a set of 2D region-of-interest masks (e.g., 304) that respectively correspond to the set of 2D medical scan projections. In various cases, each 2D region-of-interest mask can be a hard mask indicating which pixels, if any, of a corresponding 2D projection belong to a particular pathology region of a depicted anatomical structure. In various other cases, each 2D region-of-interest mask can be a soft mask indicating probabilities that pixels of a corresponding 2D projection belong to a particular pathology region of a depicted anatomical structure.

In various instances, act 1806 can include generating, by the device (e.g., 114), an enhanced 3D medical scan volume (e.g., 1102) by applying weighted reconstruction techniques to the set of 2D medical scan projections and to the set of 2D region-of-interest masks.

Although existing reconstruction techniques make use of collimation masks, those having ordinary skill in the art will appreciate that such existing reconstruction techniques are not equivalent to weighted reconstruction based on region-of-interest masks as described herein.

In any case, the reconstruction component 114 can generate the 3D region-of-interest visualization 602 based on both the set of 2D region-of-interest masks 304 and/or the set of 2D medical scan projections 202.

Figure 19:
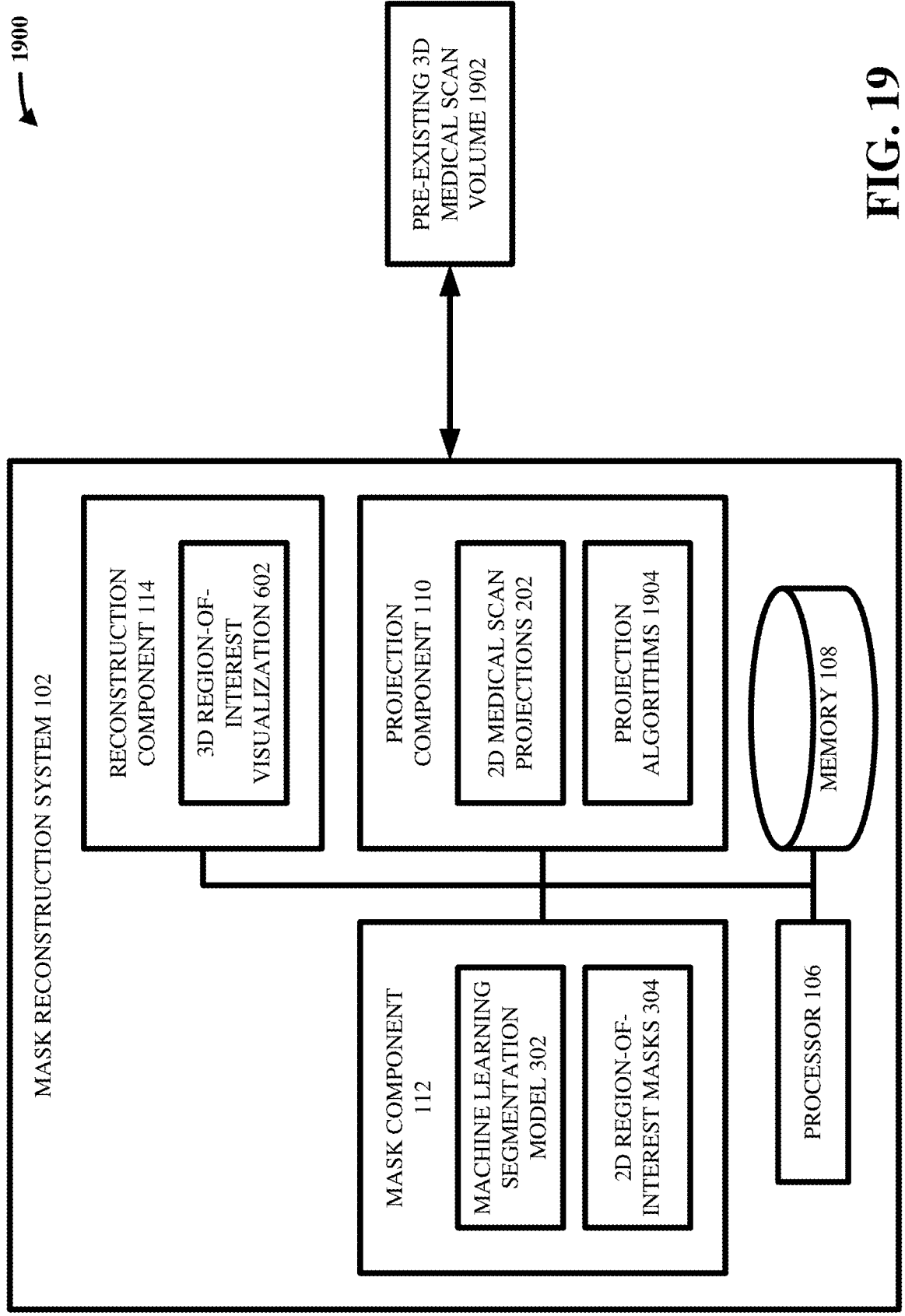
FIG. 19 illustrates a block diagram of an example, non-limiting system including a pre-existing 3D medical scan volume and one or more projection algorithms that facilitates AI-based region-of-interest masks for improved data reconstruction in accordance with one or more embodiments described herein.

FIG. 19 illustrates a block diagram of an example, non-limiting system 1900 including a pre-existing 3D medical scan volume and one or more projection algorithms that can facilitate AI-based region-of-interest masks for improved data reconstruction in accordance with one or more embodiments described herein. As shown, the system 1900 can, in some cases, comprise the same components as the system 600, and can further comprise a pre-existing 3D medical scan volume 1902 instead of the medical scanning device 104.

In various embodiments, it can be the case that the mask reconstruction system 102 does not have electronic access to the medical scanning device 104. Instead, it can be the case that the mask reconstruction system 102 has electronic access to the pre-existing 3D medical scan volume 1902. In various instances, the pre-existing 3D medical scan volume 1902 can be an already-reconstructed voxel array that depicts/illustrates the anatomical structure of the patient. If the mask reconstruction system 102 does not have electronic access to the medical scanning device 104, the projection component 110 can be unable to retrieve the set of 2D medical scan projections 202 from the medical scanning device 104. However, if the mask reconstruction system 102 has access to the pre-existing 3D medical scan volume 1902, the projection component 110 can derive the set of 2D medical scan projections 202 from the pre-existing 3D medical scan volume 1902. More specifically, in various aspects, the projection component 110 can electronically apply one or more projection algorithms 1904 to the pre-existing 3D medical scan volume 1902, thereby yielding the set of 2D medical scan projections 202. In various instances, the one or more projection algorithms 1904 can be any suitable techniques that perform the mathematical inverse functionality of a reconstruction technique. That is, while reconstruction techniques can build voxels from pixels, a projection technique can build pixels from voxels. This is more clearly shown in FIG. 20.

Figure 20:
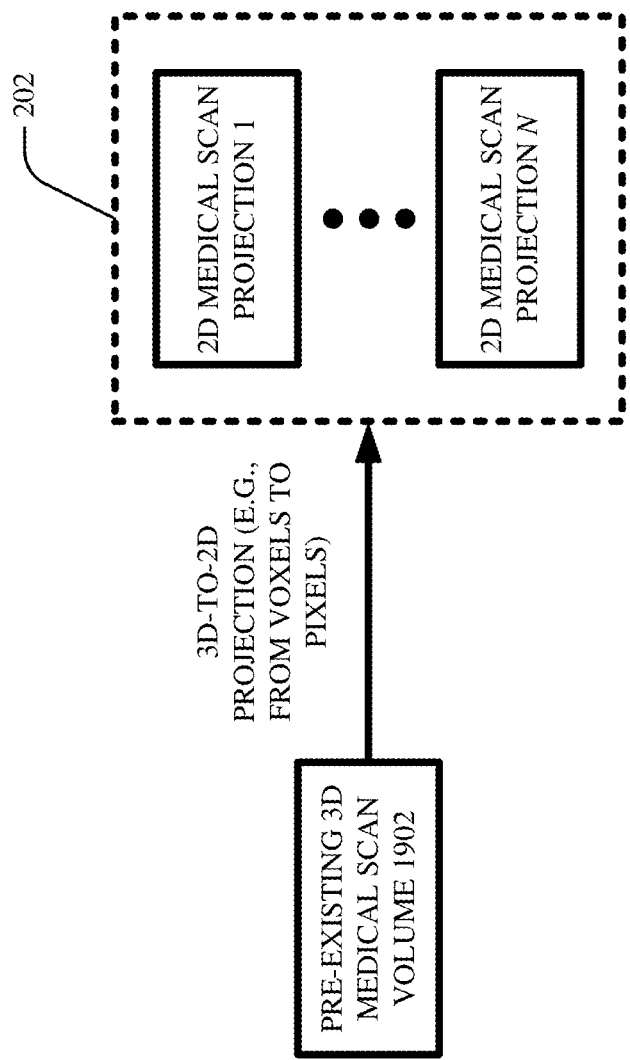
FIG. 20 illustrates an example and non-limiting way by which a set of 2D medical scan projections can be generated based on a pre-existing 3D medical scan volume in accordance with one or more embodiments described herein.

FIG. 20 illustrates an example and non-limiting way by which the set of 2D medical scan projections 202 can be generated based on the pre-existing 3D medical scan volume 1902 in accordance with one or more embodiments described herein. As shown, 3D-to-2D projection, which can be considered as the inverse and/or opposite of 2D-to-3D reconstruction, can be applied to the pre-existing 3D medical scan volume 1902, with the result being the set of 2D medical scan projections 202.

Once the projection component 110 generates the set of 2D medical scan projections 202 from the pre-existing 3D medical scan volume 1902, the mask component 112 can generate the set of 2D region-of-interest masks 304, and the reconstruction component 114 can generate the 3D region-of-interest visualization 602. As those having ordinary skill in the art will appreciate, in the one or more first embodiments where the pre-existing 3D medical scan volume 1902 is available, the reconstruction component 114 can refrain from generating the 3D medical scan volume 702 and can instead just use the pre-existing 3D medical scan volume 1902 (e.g., can generate the 3D region-of-interest visualization 602 by overlaying and/or superimposing slices of the 3D region-of-interest mask 704 onto respective slices of the pre-existing 3D medical scan volume 1902).

In other words, the mask reconstruction system 102 can still generate an improved visualization, even if the medical scanning device 104 is unavailable.

Figure 21:
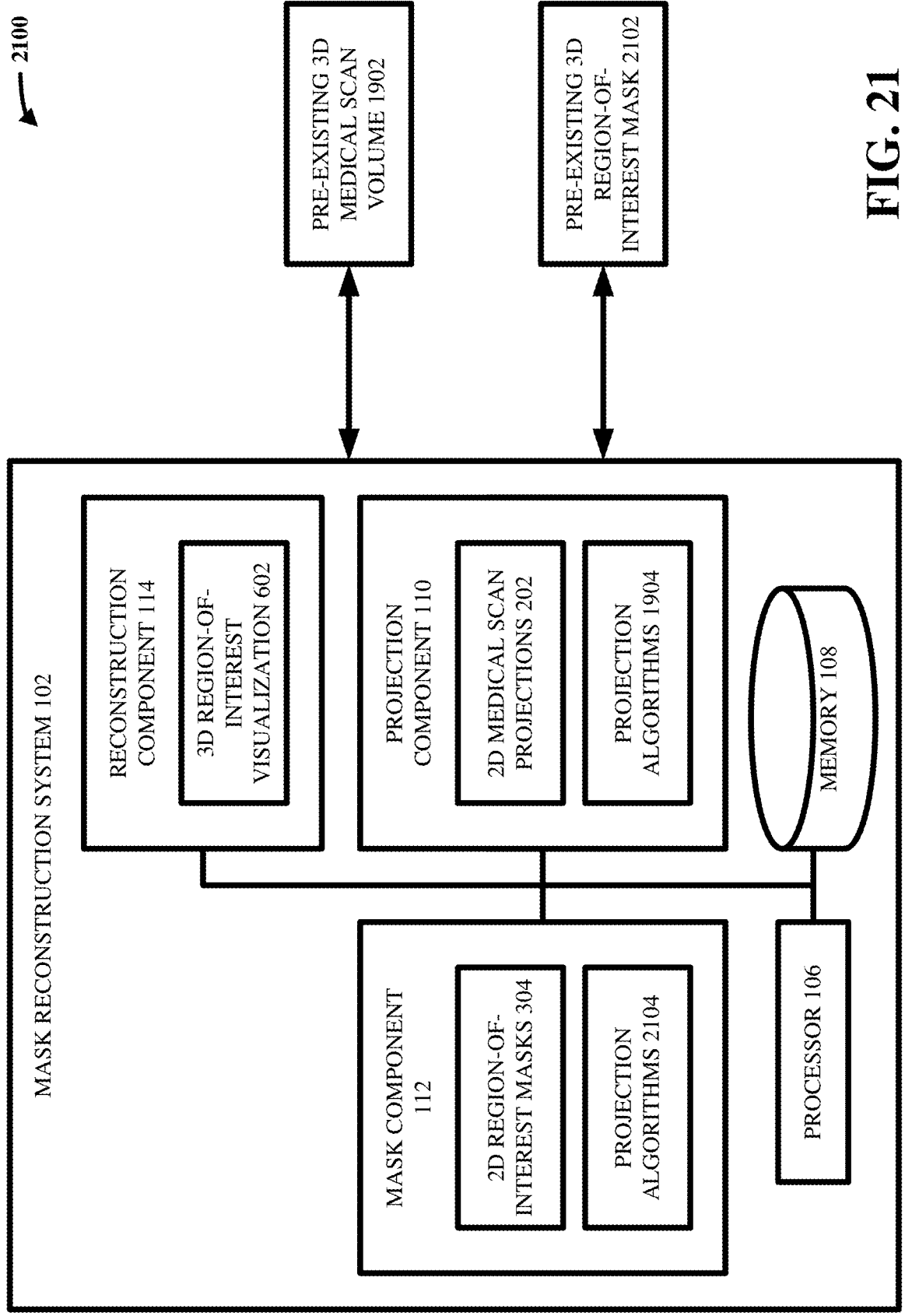
FIG. 21 illustrates a block diagram of an example, non-limiting system including a pre-existing 3D region-of-interest mask and one or more projection algorithms that facilitates AI-based region-of-interest masks for improved data reconstruction in accordance with one or more embodiments described herein.

FIG. 21 illustrates a block diagram of an example, non-limiting system 2100 including a pre-existing 3D region-of-interest mask and one or more projection algorithms that can facilitate AI-based region-of-interest masks for improved data reconstruction in accordance with one or more embodiments described herein. As shown, the system 2100 can, in some cases, comprise the same components as the system 1900, and can further comprise a pre-existing 3D region-of-interest mask 2102 instead of the machine learning segmentation model 302.

In various embodiments, it can be the case that the mask reconstruction system 102 does not have electronic access to the machine learning segmentation model 302. Instead, it can be the case that the mask reconstruction system 102 has electronic access to the pre-existing 3D region-of-interest mask 2102. In various instances, the pre-existing 3D region-of-interest mask 2102 can be an already-reconstructed voxel array that depicts/illustrates voxel-wise membership in and/or voxel-wise probabilities of belonging to the region-of-interest of the anatomical structure of the patient. In some cases, a third-party can have created the pre-existing 3D region-of-interest mask 2102 by applying any suitable artificial intelligence techniques to the pre-existing 3D medical scan volume 1902. If the mask reconstruction system 102 does not have electronic access to the machine learning segmentation model 302, the mask component 112 can be unable to execute the machine learning segmentation model 302 on the set of 2D medical scan projections 202. However, if the mask reconstruction system 102 has access to the pre-existing 3D region-of-interest mask 2102, the mask component 112 can derive the set of 2D region-of-interest masks 304 from the pre-existing 3D region-of-interest mask 2102. More specifically, in various aspects, the mask component 112 can electronically apply one or more projection algorithms 2104 to the pre-existing 3D region-of-interest mask 2102, thereby yielding the set of 2D region-of-interest masks 304. In various instances, the one or more projection algorithms 2104 can be any suitable techniques that perform the mathematical inverse functionality of a reconstruction technique. That is, while reconstruction techniques can build voxels from pixels, a projection technique can build pixels from voxels. This is more clearly shown in FIG. 22.

Figure 22:
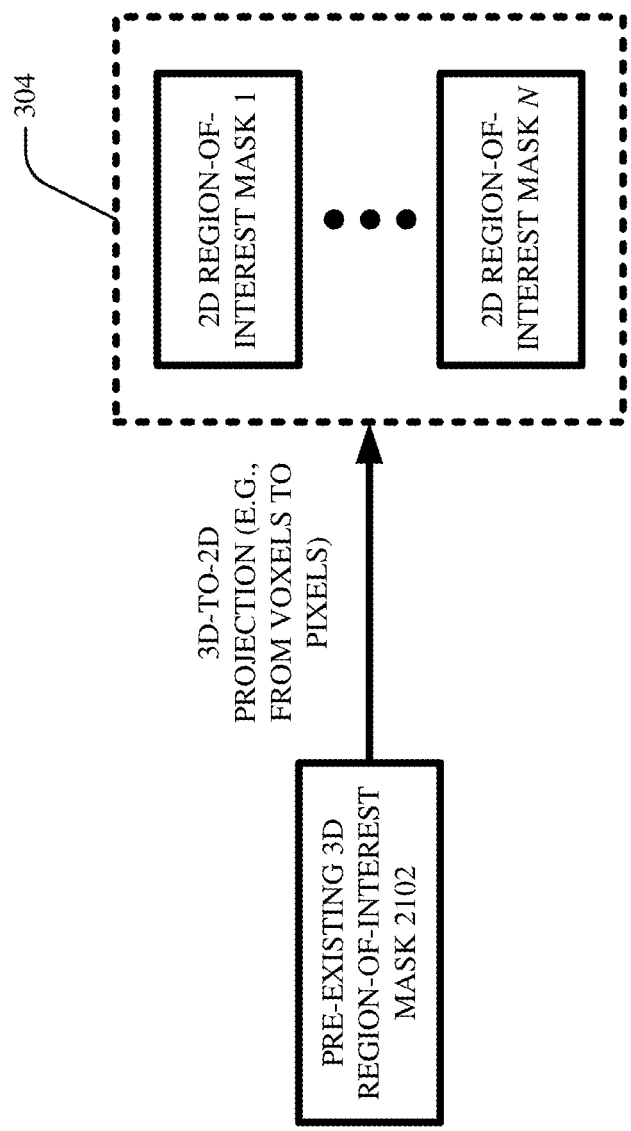
FIG. 22 illustrates an example and non-limiting way by which a set of 2D region-of-interest masks can be generated based on a pre-existing 3D region-of-interest mask in accordance with one or more embodiments described herein.

FIG. 22 illustrates an example and non-limiting way by which the set of 2D region-of-interest masks 304 can be generated based on the pre-existing 3D region-of-interest mask 2102 in accordance with one or more embodiments described herein. As shown, 3D-to-2D projection, which can be considered as the inverse and/or opposite of 2D-to-3D reconstruction, can be applied to the pre-existing 3D region-of-interest mask 2102, with the result being the set of 2D region-of-interest masks 304. In various cases, if the pre-existing 3D region-of-interest mask 2102 is a hard mask, the set of 2D region-of-interest masks 304 can likewise be hard masks. On the other hand, if the pre-existing 3D region-of-interest mask 2102 is a soft mask, the set of 2D region-of-interest masks 304 can likewise be soft masks.

Once the mask component 112 generates the set of 2D region-of-interest masks 304 from the pre-existing 3D region-of-interest mask 2102, the reconstruction component 114 can generate the 3D region-of-interest visualization 602. As those having ordinary skill in the art will appreciate, in the one or more first embodiments where the pre-existing 3D region-of-interest mask 2102 is available, the reconstruction component 114 can refrain from generating the 3D region-of-interest mask 704 and can instead just use the pre-existing 3D region-of-interest mask 2102 (e.g., can generate the 3D region-of-interest visualization 602 by overlaying and/or superimposing slices of the pre-existing 3D region-of-interest mask 2102 onto respective slices of the pre-existing 3D medical scan volume 1902).

In other words, the mask reconstruction system 102 can still generate an improved visualization, even if the machine learning segmentation model 302 is unavailable.

Figure 23:
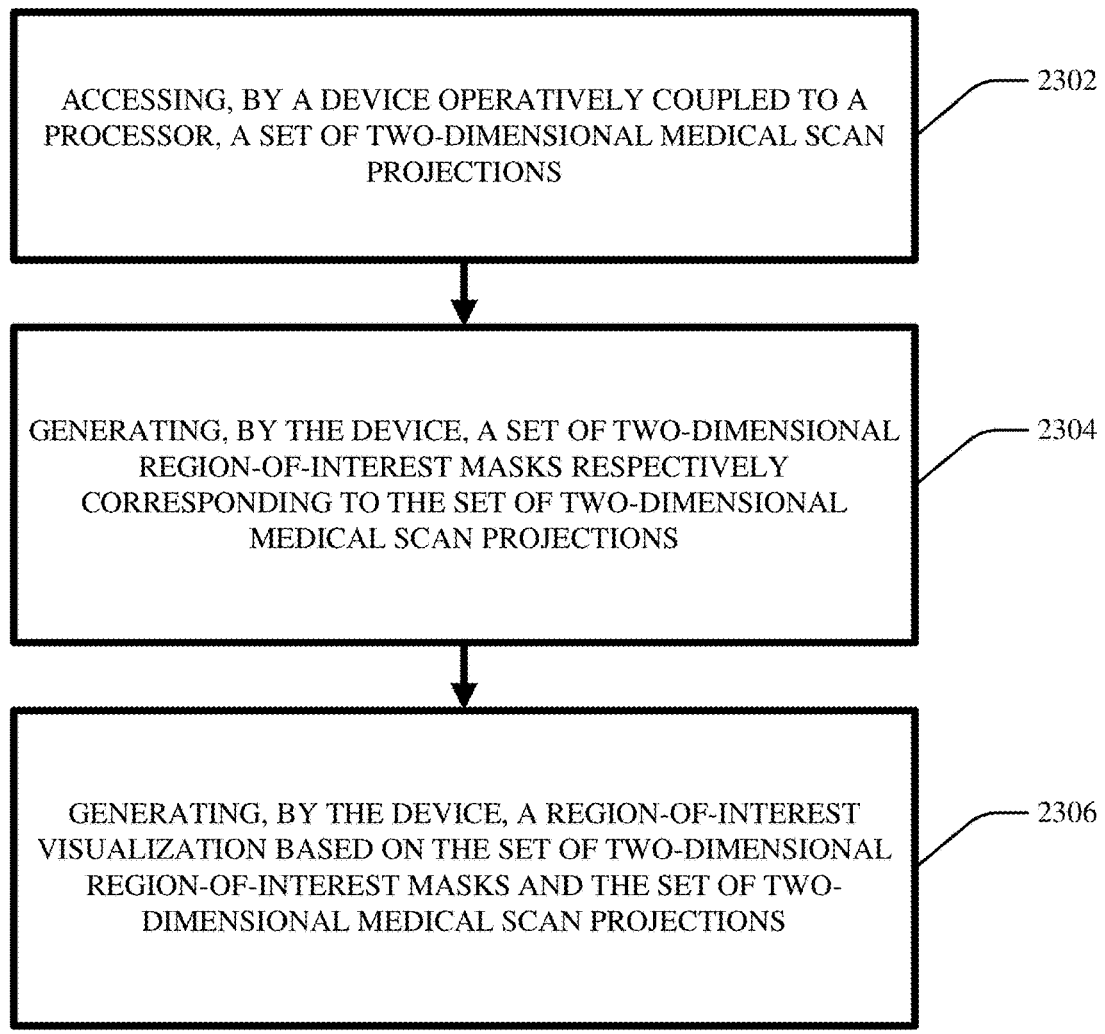
FIG. 23 illustrates a flow diagram of an example, non-limiting computer-implemented method that facilitates AI-based region-of-interest masks for improved data reconstruction in accordance with one or more embodiments described herein.

FIG. 23 illustrates a flow diagram of an example, non-limiting computer-implemented method 2300 that can facilitate AI-based region-of-interest masks for improved data reconstruction in accordance with one or more embodiments described herein. In various cases, the mask reconstruction system 102 can facilitate the computer-implemented method 2300.

In various embodiments, act 2302 can include accessing, by a device (e.g., 110) operatively coupled to a processor, a set of two-dimensional medical scan projections (e.g., 202).

In various aspects, act 2304 can include generating, by the device (e.g., 112), a set of two-dimensional region-of-interest masks (e.g., 304) respectively corresponding to the set of two-dimensional medical scan projections.

In various instances, act 2306 can include generating, by the device (e.g., 114), a region-of-interest visualization (e.g., 602) based on the set of two-dimensional region-of-interest masks and the set of two-dimensional medical scan projections.

Although not explicitly shown in FIG. 23, the generating the set of two-dimensional region-of-interest masks can include executing, by the device (e.g., 112), a machine learning segmentation model (e.g., 302) on the set of two-dimensional medical scan projections. In various cases, the machine learning segmentation model can be configured to segment more than one of the set of two-dimensional medical scan projections at a time.

Although not explicitly shown in FIG. 23, the computer-implemented method 2300 can further comprise: receiving, by the device (e.g., 110), a three-dimensional medical scan volume (e.g., 1902); and generating, by the device (e.g., 110), the set of two-dimensional medical scan projections by applying one or more projection algorithms (e.g., 1904) to the three-dimensional medical scan volume.

Although not explicitly shown in FIG. 23, the computer-implemented method 2300 can further comprise: receiving, by the device (e.g., 112), a three-dimensional region-of-interest mask (e.g., 2102) generated by a machine learning segmentation model based on the three-dimensional medical scan volume (e.g., 1902); and generating, by the device (e.g., 112), the set of two-dimensional region-of-interest masks by applying one or more projection algorithms (e.g., 2104) to the three-dimensional region-of-interest mask.

Although not explicitly shown in FIG. 23, the computer-implemented method 2300 can further comprise: generating, by the device (e.g., 114), a three-dimensional medical scan volume (e.g., 702) based on the set of two-dimensional medical scan projections; and generating, by the device (e.g., 114), a three-dimensional region-of-interest mask (e.g., 704) based on the set of two-dimensional region-of-interest masks, wherein the region-of-interest visualization includes slices of the three-dimensional region-of-interest mask overlaid onto respective slices of the three-dimensional medical scan volume.

Although not explicitly shown in FIG. 23, the computer-implemented method 2300 can further comprise: determining, by the device (e.g., 114), whether a region-of-interest is present within the three-dimensional medical scan volume, based on the three-dimensional region-of-interest mask.

Although not explicitly shown in FIG. 23, the region-of-interest visualization can be a three-dimensional medical scan volume based on the set of two-dimensional medical scan projections and enhanced via weighting by the set of two-dimensional region-of-interest masks (e.g., as described with respect to FIGS. 11-17).

Various embodiments described herein relate to analyzing data in the projection domain (e.g., raw data) to improve data in the reconstruction domain, thereby yielding improved data visualizations. In other words, described herein is an AI-based technique to provide reconstructed data that is based on AI-processing of raw projections. More specifically, various embodiments described herein can include a computerized tool (e.g., 102) that can electronically obtain a set of raw projections (e.g., 202), that can electronically generate a set of region-of-interest masks (e.g., 304) by executing a machine learning segmentation model (e.g., 302) on the set of raw projections, and/or that can generate an improved visualization (e.g., 602) based on both the set of raw projections and the set of region-of-interest masks. In some cases, the computerized tool can reconstruct a 3D volume from the set of raw projections, can reconstruct a 3D mask from the set of region-of-interest masks, and can generate the improved visualization by overlaying and/or superimposing the 3D mask onto the 3D volume. In other cases, the computerized tool can apply weighted reconstruction to both the set of raw projections and the set of region-of-interest masks, thereby yielding an enhanced 3D volume that can be considered as the improved visualization. In any case, application of artificial intelligence techniques to raw projections rather than to reconstructed slices can cause the improved visualization to visually emphasize and/or highlight regions-of-interest, which is beneficial for purposes of diagnosis and/or prognosis. Thus, embodiments described herein certainly constitute a concrete and tangible technical improvement in the field of data reconstruction.

Although the herein disclosure mainly describes embodiments of the subject innovation as applied in a medical context (e.g., involving medical scans/projections of an anatomical structure of a patient), this is a mere non-limiting example. Those having ordinary skill in the art will appreciate that the herein described techniques can be implemented in any suitable context where 2D-to-3D reconstruction is utilized. Accordingly, when embodiments of the subject innovation are implemented in a medical context, a region-of-interest as described herein can be a pathology (e.g., diseased portion) of an anatomical structure of a patient. In contrast, when embodiments of the subject innovation are implemented outside of a medical context, a region-of-interest can be any suitable object and/or portion of an object, as desired and/or as otherwise stipulated by an operator/user.

Those having ordinary skill in the art will appreciate that the herein disclosure describes non-limiting examples of various embodiments of the invention. For ease of description and/or explanation, various portions of the herein disclosure utilize the term "each" when discussing various embodiments of the invention. Those having ordinary skill in the art will appreciate that such usages of the term "each" are non-limiting examples. In other words, when the herein disclosure provides a description that is applied to "each" of some particular computerized object and/or component, it should be understood that this is a non-limiting example of various embodiments of the invention, and it should be further understood that, in various other embodiments of the invention, it can be the case that such description applies to fewer than "each" of that particular computerized object.

To facilitate some of the above-described machine learning aspects of various embodiments of the subject innovation, consider the following discussion of artificial intelligence. Various embodiments of the present innovation herein can employ artificial intelligence (AI) to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 24:
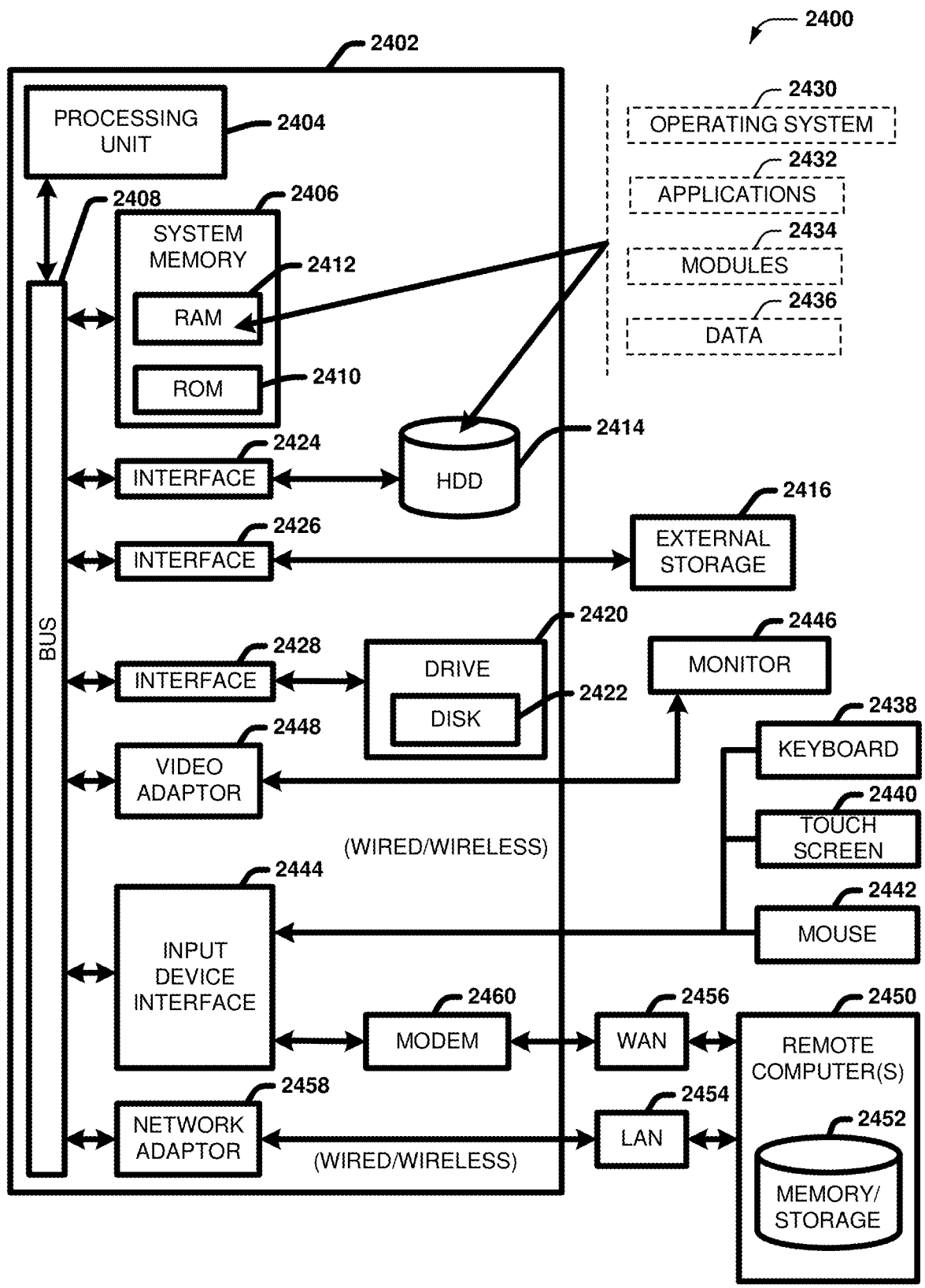
FIG. 24 illustrates a block diagram of an example, non-limiting operating environment in which one or more embodiments described herein can be facilitated.

In order to provide additional context for various embodiments described herein, FIG. 24 and the following discussion are intended to provide a brief, general description of a suitable computing environment 2400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 24, the example environment 2400 for implementing various embodiments of the aspects described herein includes a computer 2402, the computer 2402 including a processing unit 2404, a system memory 2406 and a system bus 2408. The system bus 2408 couples system components including, but not limited to, the system memory 2406 to the processing unit 2404. The processing unit 2404 can be any of various commercially available processors. Dual microprocessors and other multi processor architectures can also be employed as the processing unit 2404.

The system bus 2408 can be any of several types of bus structure that can further interconnect to a memory bus (with or without a memory controller), a peripheral bus, and a local bus using any of a variety of commercially available bus architectures. The system memory 2406 includes ROM 2410 and RAM 2412. A basic input/output system (BIOS) can be stored in a non-volatile memory such as ROM, erasable programmable read only memory (EPROM), EEPROM, which BIOS contains the basic routines that help to transfer information between elements within the computer 2402, such as during startup. The RAM 2412 can also include a high-speed RAM such as static RAM for caching data.

The computer 2402 further includes an internal hard disk drive (HDD) 2414 (e.g., EIDE, SATA), one or more external storage devices 2416 (e.g., a magnetic floppy disk drive (FDD) 2416, a memory stick or flash drive reader, a memory card reader, etc.) and a drive 2420, e.g., such as a solid state drive, an optical disk drive, which can read or write from a disk 2422, such as a CD-ROM disc, a DVD, a BD, etc. Alternatively, where a solid state drive is involved, disk 2422 would not be included, unless separate. While the internal HDD 2414 is illustrated as located within the computer 2402, the internal HDD 2414 can also be configured for external use in a suitable chassis (not shown). Additionally, while not shown in environment 2400, a solid state drive (SSD) could be used in addition to, or in place of, an HDD 2414. The HDD 2414, external storage device(s) 2416 and drive 2420 can be connected to the system bus 2408 by an HDD interface 2424, an external storage interface 2426 and a drive interface 2428, respectively. The interface 2424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2412, including an operating system 2430, one or more application programs 2432, other program modules 2434 and program data 2436. All or portions of the operating system, applications, modules, and/or data can also be cached in the RAM 2412. The systems and methods described herein can be implemented utilizing various commercially available operating systems or combinations of operating systems.

Computer 2402 can optionally comprise emulation technologies. For example, a hypervisor (not shown) or other intermediary can emulate a hardware environment for operating system 2430, and the emulated hardware can optionally be different from the hardware illustrated in FIG. 24. In such an embodiment, operating system 2430 can comprise one virtual machine (VM) of multiple VMs hosted at computer 2402. Furthermore, operating system 2430 can provide runtime environments, such as the Java runtime environment or the .NET framework, for applications 2432. Runtime environments are consistent execution environments that allow applications 2432 to run on any operating system that includes the runtime environment. Similarly, operating system 2430 can support containers, and applications 2432 can be in the form of containers, which are lightweight, standalone, executable packages of software that include, e.g., code, runtime, system tools, system libraries and settings for an application.

Further, computer 2402 can be enable with a security module, such as a trusted processing module (TPM). For instance with a TPM, boot components hash next in time boot components, and wait for a match of results to secured values, before loading a next boot component. This process can take place at any layer in the code execution stack of computer 2402, e.g., applied at the application execution level or at the operating system (OS) kernel level, thereby enabling security at any level of code execution.

A user can enter commands and information into the computer 2402 through one or more wired/wireless input devices, e.g., a keyboard 2438, a touch screen 2440, and a pointing device, such as a mouse 2442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2404 through an input device interface 2444 that can be coupled to the system bus 2408, but can be connected by other interfaces, such as a parallel port, an IEEE 1394 serial port, a game port, a USB port, an IR interface, a BLUETOOTH® interface, etc.

A monitor 2446 or other type of display device can be also connected to the system bus 2408 via an interface, such as a video adapter 2448. In addition to the monitor 2446, a computer typically includes other peripheral output devices (not shown), such as speakers, printers, etc.

The computer 2402 can operate in a networked environment using logical connections via wired and/or wireless communications to one or more remote computers, such as a remote computer(s) 2450. The remote computer(s) 2450 can be a workstation, a server computer, a router, a personal computer, portable computer, microprocessor-based entertainment appliance, a peer device or other common network node, and typically includes many or all of the elements described relative to the computer 2402, although, for purposes of brevity, only a memory/storage device 2452 is illustrated. The logical connections depicted include wired/wireless connectivity to a local area network (LAN) 2454 and/or larger networks, e.g., a wide area network (WAN) 2456. Such LAN and WAN networking environments are commonplace in offices and companies, and facilitate enterprise-wide computer networks, such as intranets, all of which can connect to a global communications network, e.g., the Internet.

When used in a LAN networking environment, the computer 2402 can be connected to the local network 2454 through a wired and/or wireless communication network interface or adapter 2458. The adapter 2458 can facilitate wired or wireless communication to the LAN 2454, which can also include a wireless access point (AP) disposed thereon for communicating with the adapter 2458 in a wireless mode.

When used in a WAN networking environment, the computer 2402 can include a modem 2460 or can be connected to a communications server on the WAN 2456 via other means for establishing communications over the WAN 2456, such as by way of the Internet. The modem 2460, which can be internal or external and a wired or wireless device, can be connected to the system bus 2408 via the input device interface 2444. In a networked environment, program modules depicted relative to the computer 2402 or portions thereof, can be stored in the remote memory/storage device 2452. It will be appreciated that the network connections shown are example and other means of establishing a communications link between the computers can be used.

When used in either a LAN or WAN networking environment, the computer 2402 can access cloud storage systems or other network-based storage systems in addition to, or in place of, external storage devices 2416 as described above, such as but not limited to a network virtual machine providing one or more aspects of storage or processing of information. Generally, a connection between the computer 2402 and a cloud storage system can be established over a LAN 2454 or WAN 2456 e.g., by the adapter 2458 or modem 2460, respectively. Upon connecting the computer 2402 to an associated cloud storage system, the external storage interface 2426 can, with the aid of the adapter 2458 and/or modem 2460, manage storage provided by the cloud storage system as it would other types of external storage. For instance, the external storage interface 2426 can be configured to provide access to cloud storage sources as if those sources were physically connected to the computer 2402.

The computer 2402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 25:
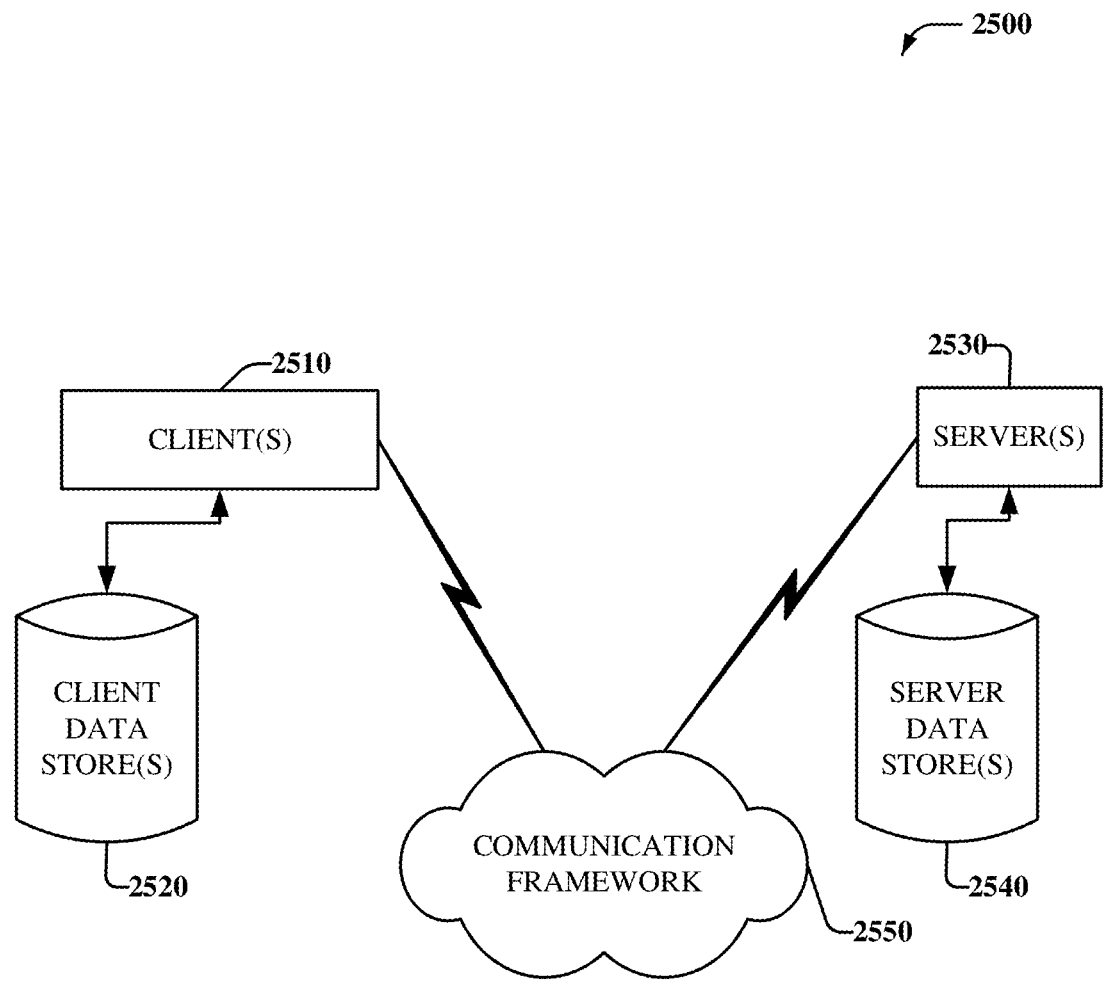
FIG. 25 illustrates an example networking environment operable to execute various implementations described herein.

FIG. 25 is a schematic block diagram of a sample computing environment 2500 with which the disclosed subject matter can interact. The sample computing environment 2500 includes one or more client(s) 2510. The client(s) 2510 can be hardware and/or software (e.g., threads, processes, computing devices). The sample computing environment 2500 also includes one or more server(s) 2530. The server(s) 2530 can also be hardware and/or software (e.g., threads, processes, computing devices). The servers 2530 can house threads to perform transformations by employing one or more embodiments as described herein, for example. One possible communication between a client 2510 and a server 2530 can be in the form of a data packet adapted to be transmitted between two or more computer processes. The sample computing environment 2500 includes a communication framework 2550 that can be employed to facilitate communications between the client(s) 2510 and the server(s) 2530. The client(s) 2510 are operably connected to one or more client data store(s) 2520 that can be employed to store information local to the client(s) 2510. Similarly, the server(s) 2530 are operably connected to one or more server data store(s) 2540 that can be employed to store information local to the servers 2530.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor that executes computer-executable components stored in a computer-readable memory, the computer-executable components comprising:
        a projection component that accesses a set of two-dimensional medical scan projections associated with a three-dimensional scan of a body part of a patient;
        a mask component that generates a set of two-dimensional region-of-interest masks respectively corresponding to the set of two-dimensional medical scan projections, wherein the set of two-dimensional region-of-interest masks identify respective probabilities of pixels of two-dimensional medical scan projections of the set of two-dimensional medical scan projections belonging to one or more pathology regions; and
        a reconstruction component that generates a three-dimensional region-of-interest visualization of the body part of the patient based on the set of two-dimensional region-of-interest masks and the set of two-dimensional medical scan projections, wherein the reconstruction component enhances one or more voxels of the three-dimensional region-of-interest visualization that are determined to be part of the one or more pathology regions based on respective probabilities of voxels of the three-dimensional region-of-interest visualization and a defined probability threshold, and wherein the respective probabilities of the voxels are based on the respective probabilities of pixels used to generate the voxels.

2. The system of claim 1, wherein the mask component generates the set of two-dimensional region-of-interest masks by executing a machine learning segmentation model on the set of two-dimensional medical scan projections.

3. The system of claim 2, wherein the machine learning segmentation model is configured to segment more than one of the set of two-dimensional medical scan projections at a time.

4. The system of claim 1, wherein the projection component receives a three-dimensional medical scan volume, and wherein the projection component generates the set of two-dimensional medical scan projections by applying one or more projection algorithms to the three-dimensional medical scan volume.

5. The system of claim 4, wherein the projection component receives a three-dimensional region-of-interest mask generated by a machine learning segmentation model based on the three-dimensional medical scan volume, and wherein the mask component generates the set of two-dimensional region-of-interest masks by applying one or more projection algorithms to the three-dimensional region-of-interest mask.

6. The system of claim 1, wherein the reconstruction component generates a three-dimensional medical scan volume based on the set of two-dimensional medical scan projections, wherein the reconstruction component generates a three-dimensional region-of-interest mask based on the set of two-dimensional region-of-interest masks, and wherein the three-dimensional region-of-interest visualization includes slices of the three-dimensional region-of-interest mask overlaid onto respective slices of the three-dimensional medical scan volume.

7. The system of claim 6, wherein the reconstruction component determines an overall likelihood of the one or more pathology regions being present in the three-dimensional medical scan volume, based on the three-dimensional region-of-interest mask comprising the respective probabilities of the voxels.

8. The system of claim 1, wherein the three-dimensional region-of-interest visualization is a three-dimensional medical scan volume based on the set of two-dimensional medical scan projections and enhanced via weighting based on the respective probabilities of the voxels.

9. A computer-implemented method, comprising:
    accessing, by a device operatively coupled to a processor, a set of two-dimensional medical scan projections associated with a three-dimensional scan of a body part of a patient;
    generating, by the device, a set of two-dimensional region-of-interest masks respectively corresponding to the set of two-dimensional medical scan projections, wherein the set of two-dimensional region-of-interest masks identify respective probabilities of pixels of two-dimensional medical scan projections of the set of two-dimensional medical scan projections belonging to one or more pathology regions; and
    generating, by the device, a three-dimensional region-of-interest visualization of the body part of the patient based on the set of two-dimensional region-of-interest masks and the set of two-dimensional medical scan projections, wherein the generating comprises enhancing one or more voxels of the three-dimensional region-of-interest visualization that are determined to be part of the one or more pathology regions based on respective probabilities of voxels of the three-dimensional region-of-interest visualization and a defined probability threshold, and wherein the respective probabilities of the voxels are based on the respective probabilities of pixels used to generate the voxels.

10. The computer-implemented method of claim 9, wherein the generating the set of two-dimensional region-of-interest masks includes executing, by the device, a machine learning segmentation model on the set of two-dimensional medical scan projections.

11. The computer-implemented method of claim 10, wherein the machine learning segmentation model is configured to segment more than one of the set of two-dimensional medical scan projections at a time.

12. The computer-implemented method of claim 9, further comprising:
    receiving, by the device, a three-dimensional medical scan volume; and
    generating, by the device, the set of two-dimensional medical scan projections by applying one or more projection algorithms to the three-dimensional medical scan volume.

13. The computer-implemented method of claim 12, further comprising:
    receiving, by the device, a three-dimensional region-of-interest mask generated by a machine learning segmentation model based on the three-dimensional medical scan volume; and
    generating, by the device, the set of two-dimensional region-of-interest masks by applying one or more projection algorithms to the three-dimensional region-of-interest mask.

14. The computer-implemented method of claim 9, further comprising:
    generating, by the device, a three-dimensional medical scan volume based on the set of two-dimensional medical scan projections; and
    generating, by the device, a three-dimensional region-of-interest mask based on the set of two-dimensional region-of-interest masks, wherein the three-dimensional region-of-interest visualization includes slices of the three-dimensional region-of-interest mask overlaid onto respective slices of the three-dimensional medical scan volume.

15. The computer-implemented method of claim 14, further comprising:
    determining, by the device, an overall likelihood of the one or more pathology regions being present in the three-dimensional medical scan volume, based on the three-dimensional region-of-interest mask comprising the respective probabilities of the voxels.

16. The computer-implemented method of claim 9, wherein the three-dimensional region-of-interest visualization is a three-dimensional medical scan volume based on the set of two-dimensional medical scan projections and enhanced via weighting based on the respective probabilities of the voxels.

17. A computer program product for facilitating AI-based region-of-interest masks for improved data reconstruction, the computer program product comprising a computer-readable memory having program instructions embodied therewith, the program instructions executable by a processor to cause the processor to:
    access a set of two-dimensional medical scan projections associated with a three-dimensional scan of a body part of a patient;
    generate a set of two-dimensional region-of-interest masks respectively corresponding to the set of two-dimensional medical scan projections, wherein the set of two-dimensional region-of-interest masks identify respective probabilities of pixels of two-dimensional medical scan projections of the set of two-dimensional medical scan projections belonging to one or more pathology regions; and
    generate a three-dimensional region-of-interest visualization of the body part of the patient based on the set of two-dimensional region-of-interest masks and the set of two-dimensional medical scan projections, wherein the generating comprises enhancing one or more voxels of the three-dimensional region-of-interest visualization that are determined to be part of the one or more pathology regions based on respective probabilities of voxels of the three-dimensional region-of-interest visualization and a defined probability threshold, and wherein the respective probabilities of the voxels are based on the respective probabilities of pixels used to generate the voxels.

18. The computer program product of claim 17, wherein the processor generates the set of two-dimensional region-of-interest masks by executing a machine learning segmentation model on the set of two-dimensional medical scan projections.

19. The computer program product of claim 18, wherein the machine learning segmentation model is configured to segment more than one of the set of two-dimensional medical scan projections at a time.

20. The computer program product of claim 17, wherein the program instructions are further executable to cause the processor to:
    receive a three-dimensional medical scan volume; and
    generate the set of two-dimensional medical scan projections by applying one or more projection algorithms to the three-dimensional medical scan volume.

* * * * *